United States Patent
Imai

(10) Patent No.: US 9,288,115 B2
(45) Date of Patent: Mar. 15, 2016

(54) NETWORK DESIGN DEVICE

(71) Applicant: FUJITSU LIMITED, Kawasaki-shi, Kanagawa (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 13/666,555

(22) Filed: Nov. 1, 2012

(65) Prior Publication Data

US 2013/0136034 A1    May 30, 2013

(30) Foreign Application Priority Data

Nov. 24, 2011 (JP) ................................. 2011-256397

(51) Int. Cl.
*H04L 12/28* (2006.01)
*H04L 12/24* (2006.01)

(52) U.S. Cl.
CPC .................................. *H04L 41/145* (2013.01)

(58) Field of Classification Search
CPC ......... H04L 47/10; H04L 47/35; H04L 47/30; H04L 47/32; H04L 5/0053; H04L 43/50; H04L 43/08; H04L 41/12; H04L 45/02; H04L 45/00; H04L 65/00; H04L 41/145; H04W 40/02; H04W 40/24; H04W 40/34; H04W 24/00
USPC ......... 370/235, 236, 238, 252, 254, 255, 257, 370/351, 400
See application file for complete search history.

(56) References Cited

U.S. PATENT DOCUMENTS

| | | | | |
|---|---|---|---|---|
| 6,215,771 B1* | 4/2001 | Turner et al. | .................. | 370/235 |
| 6,404,744 B1* | 6/2002 | Saito | .............................. | 370/255 |
| 2002/0181403 A1* | 12/2002 | Shiraki et al. | ................. | 370/238 |
| 2003/0043861 A1* | 3/2003 | Saito | .............................. | 370/539 |

FOREIGN PATENT DOCUMENTS

| | | |
|---|---|---|
| JP | 11-215124 | 8/1999 |
| JP | 2008-506197 | 2/2008 |
| WO | 2006/010034 A2 | 1/2006 |

OTHER PUBLICATIONS

Joseph Chabarek et al.; "Power Awareness in Network Design and Routing"; 27th IEEE Conference on Computer Communications (INFOCOM); 2008; pp. 457-465.

(Continued)

*Primary Examiner* — Mark Rinehart
*Assistant Examiner* — Natali N Pascual Peguero
(74) *Attorney, Agent, or Firm* — Staas & Halsey LLP

(57) ABSTRACT

According to the information about a request bandwidth of a path newly requested between a starting site and an ending site of the requested path and the information about the type of a device candidate which may be provided at each site and the number of ports of each device, an objective function indicating a device cost and a constraint to be considered when the objective function is minimized are set. According to the arithmetic performance of a solver for executing the design, a problem scale corresponding to one path accommodation designing operation is set. Based on the set problem scale, a mathematical programming problem for minimizing the objective function is generated. An accommodation designing process is repeated on a plurality of paths until a solution to the mathematical programming problem is obtained by the solver, and all requested paths are completely designed.

10 Claims, 29 Drawing Sheets

(56) References Cited

OTHER PUBLICATIONS

Japanese Office Action dated Mar. 10, 2015 in corresponding Japanese Patent Application No. 2011-256397.

Imai et al., "Energy Saving Network (ESNet) design -a network design scheme based on a mathematical programming model-", Proceedings of the 2011 IEICE Society Conference No. 2, Japan, Institute of Electronics, Information and Communication Engineers, Aug. 30, 2011, 2 pp.

* cited by examiner

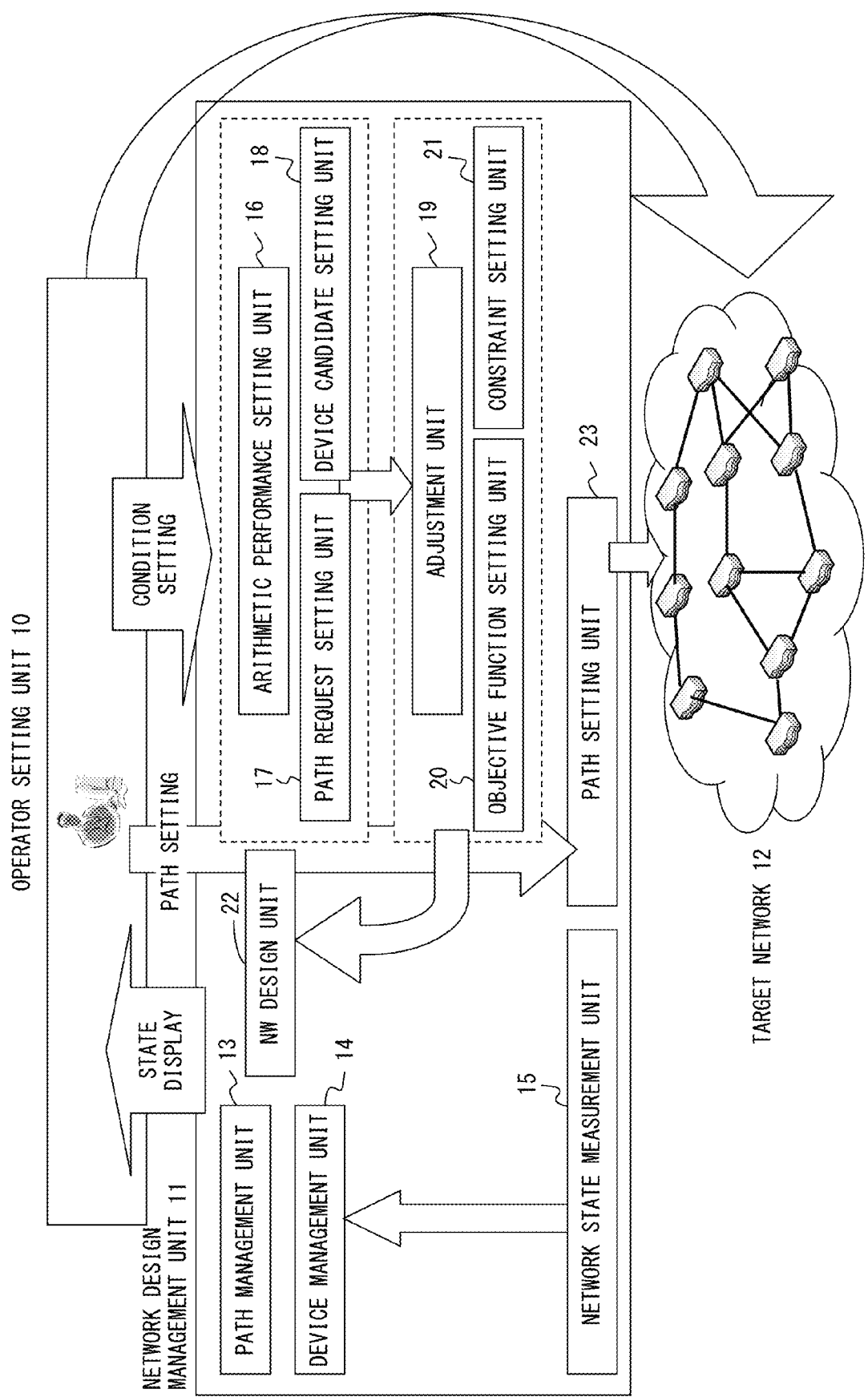
F I G. 1

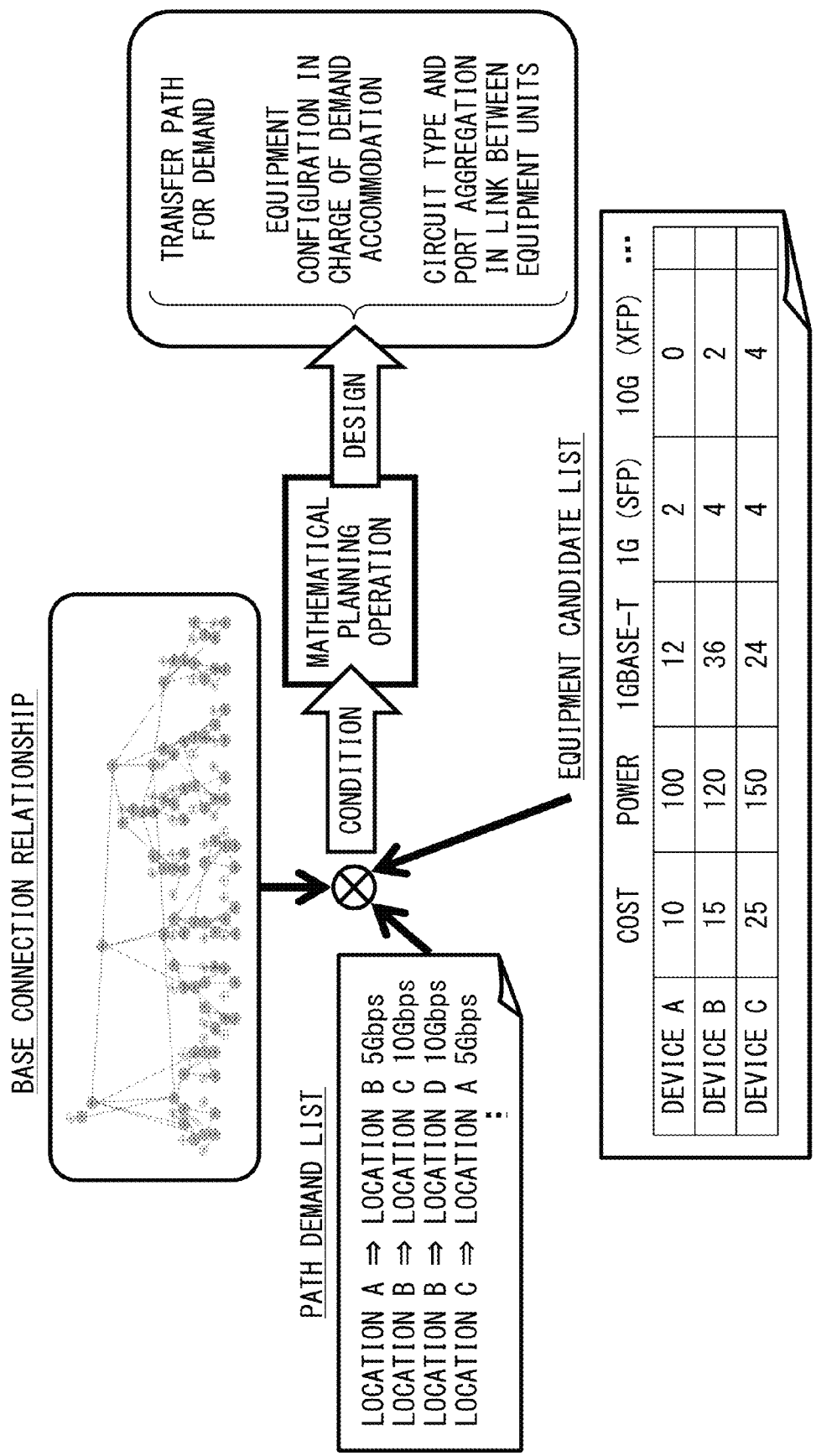
F I G. 2

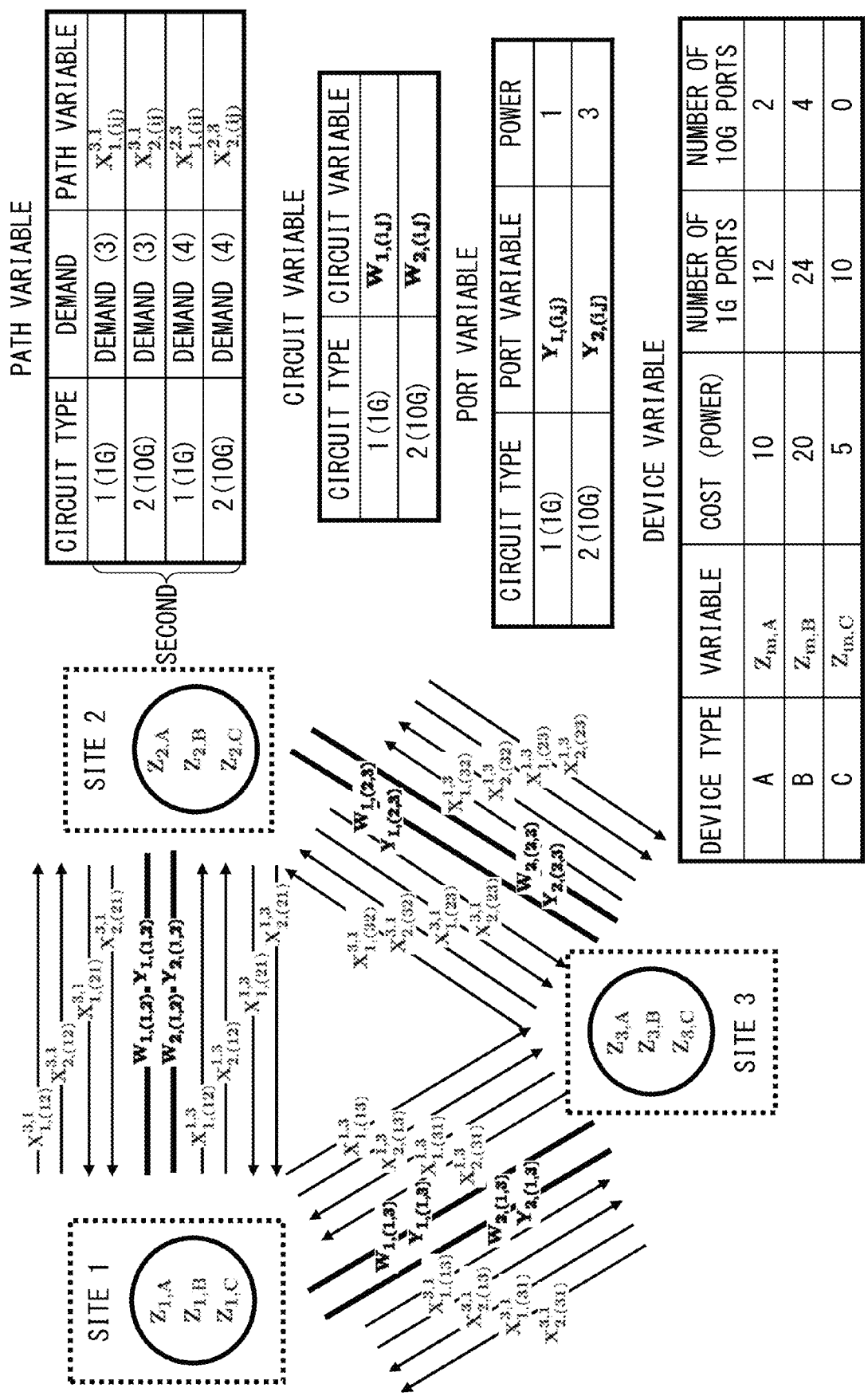
F I G. 5

TABLE 1 VARIABLES AND FUNCTIONS

| VARIABLE NAME | USE | DEFINITION |
|---|---|---|
| $Z_{m,k} \in \{0,1\}$ | Design | PRESENCE/ABSENCE OF PROVIDING DEVICE k FOR SITE $m\,(\in V)$ |
| $X_{r,(i,j)}^{(s,d)} \in \{0,1\}$ | Design | PRESENCE/ABSENCE OF TRAFFIC PATH OF $(s,d)$ SECTION DEMAND FOR $(i \rightarrow j)$ LINK OF PORT TYPE r |
| $W_{r,(i,j)} \in \{0,1\}$ | Design | PRESENCE/ABSENCE OF USE OF PORT TYPE r BETWEEN SITES i AND j |
| $Y_{r,(i,j)} \in \mathbb{Z}$ | Design | NUMBER OF PORTS TO BE USED OF PORT TYPE r BETWEEN SITES i AND j |
| $E_{m,k}$ | Given | POWER COST OF DEVICE k PROVIDED AT SITE m |
| $P_r$ | Given | POWER COST FOR EACH PORT OF PORT TYPE r |
| $H^{(s,d)}$ | Given | UPPER LIMIT OF HOP COUNT OF $(s,d)$ SECTION DEMAND |
| $B^{(s,d)}$ | Given | REQUEST BAND OF $(s,d)$ SECTION DEMAND |
| $T_{i,j}$ | Given | AMOUNT OF TRAFFIC ALREADY PASSING THROUGH $(i \rightarrow j)$ LINK |
| $L_r$ | Given | RATE OF PORT TYPE r |
| $p_{r,k}$ | Given | NUMBER OF PORTS OF PORT TYPE r LOADED IN DEVICE k |
| $D_{r,m}$ | Given | NUMBER OF PORTS TO BE USED OF PORT TYPE r USED AS INPUT/OUTPUT (Source/Destination) OF TRAFFIC AT SITE m |
| $LA_{r,(i,j)}$ | Given | UPPER LIMIT OF LINK AGGREGATION OF PORT TYPE r USED BETWEEN SITES i AND j |

Minimize
$$\sum_m \sum_k E_{m,k} Z_{m,k} + \sum_r \sum_{(i,j)} P_r Y_{r,(i,j)}$$

subject to
$$\sum_r \left( \sum_j X_{r,(i,j)}^{(s,d)} - \sum_j X_{r,(j,i)}^{(s,d)} \right) = \begin{cases} 1 & \forall (s,d), i=s \\ -1 & \forall (s,d), i=d \\ 0 & \forall (s,d), i \neq s,d \end{cases}$$

$$X_{r,(i,j)}^{(s,d)} + X_{r,(j,i)}^{(s,d)} \leq W_{r,(i,j)} \quad \forall r, (s,d), (i,j) \in E$$

$$\sum_r W_{r,(i,j)} \leq 1 \quad \forall (i,j) \in E$$

$$\sum_r \sum_{(i,j)} X_{r,(i,j)}^{(s,d)} \leq H^{(s,d)} \quad \forall (s,d)$$

$$\sum_k Z_{m,k} \leq 1 \quad \forall m$$

$$\sum_r (L_r Y_{r,(m,j)}) - \sum_{(s,d)} B^{(s,d)} X_{r,(m,j)}^{(s,d)} \geq T_{m,j} \quad \forall (m,j)$$

$$\sum_r (L_r Y_{r,(m,j)}) - \sum_{(s,d)} B^{(s,d)} X_{r,(j,m)}^{(s,d)} \geq T_{j,m} \quad \forall r, m$$

$$\sum_j Y_{r,(m,j)} \leq \sum_k p_{r,k} Z_{m,k} - D_{r,m} \quad \forall r, m$$

$$Y_{r,(i,j)} \leq 1000 W_{r,(i,j)} \quad \forall r, (i,j) \in E$$

$$Y_{r,(i,j)} \leq LA_{r,(i,j)} \quad \forall r, (i,j) \in E$$

F I G. 6

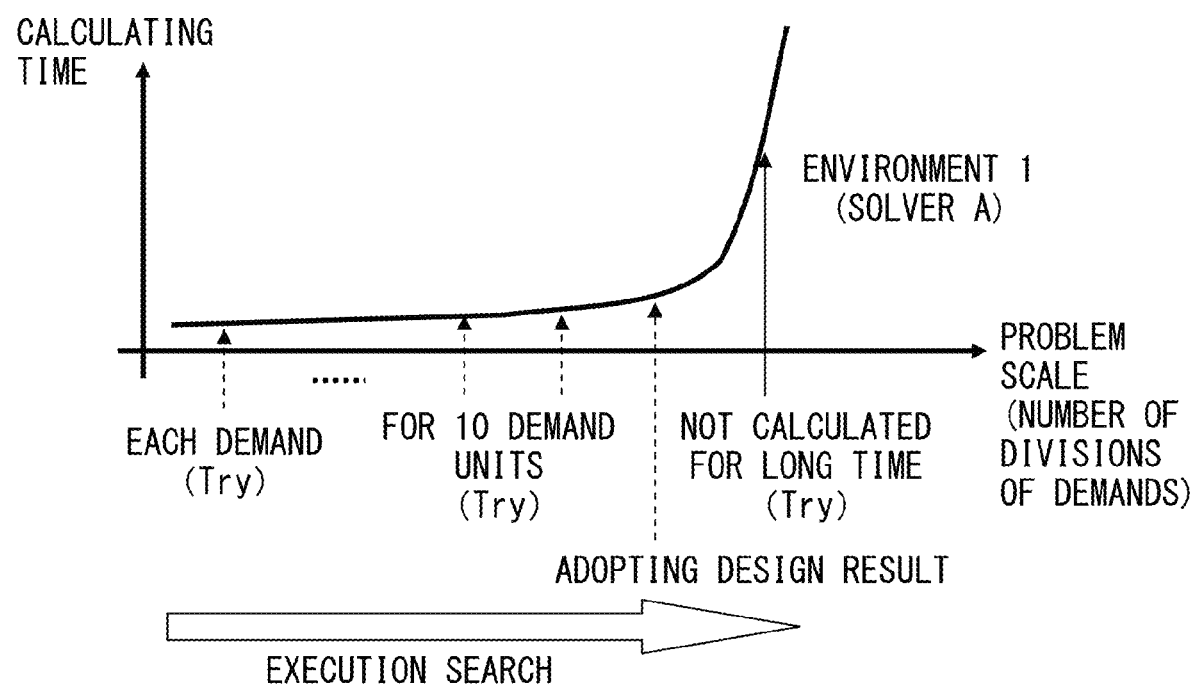
F I G. 9

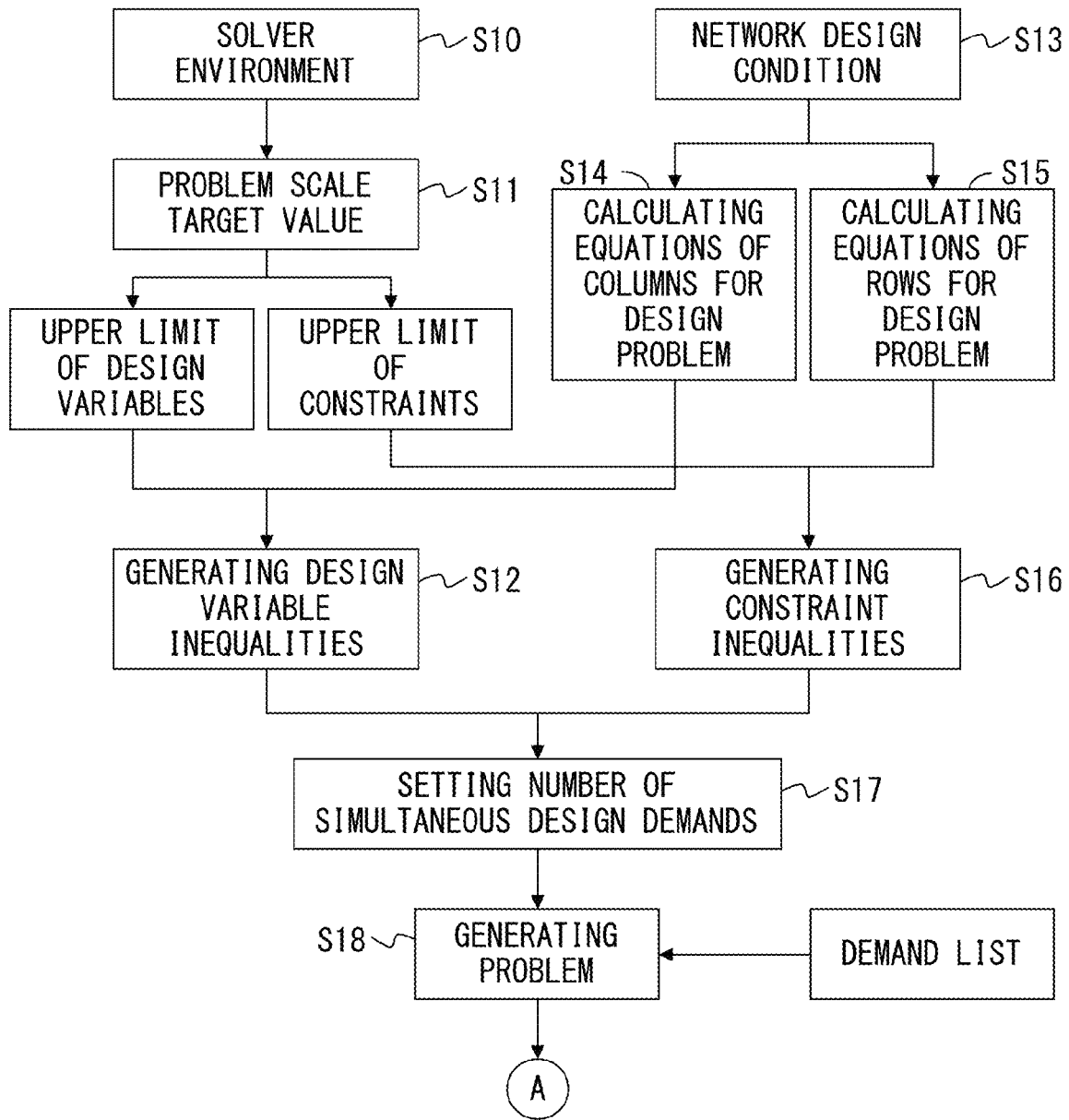
F I G. 1 0

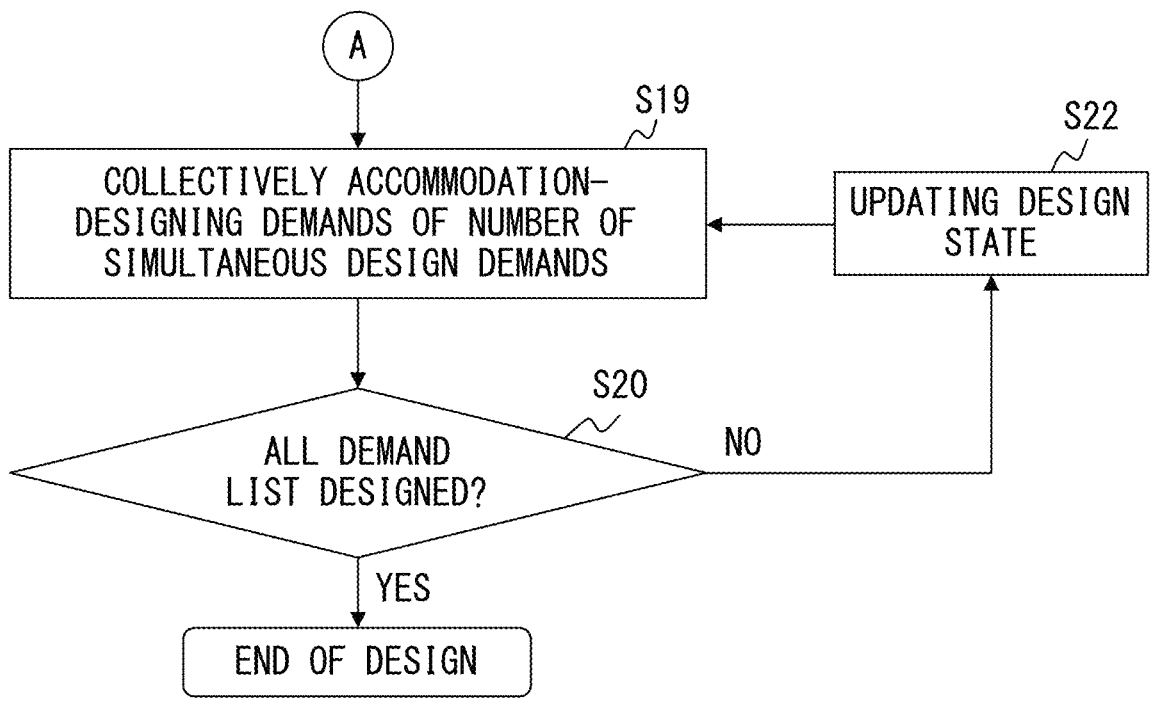
F I G. 1 1

FIG. 12

- PROBLEM SCALE
  - NUMBER OF COLUMNS = NUMBER OF DESIGN VARIABLES
    - $(K*M) + (2*D*R*L) + (2R*L)$
  - NUMBER OF ROWS = CONSTRAINTS
    - $D*[M+(R*L)+1]$
    - $+L+M+(2*L)$
    - $+(R*M)+(2*R*L)$

VARIABLE PARAMETER
NUMBER OF DEMANDS D

Given PARAMETERS
NUMBER OF PHYSICAL LINKS L
NUMBER OF SITES M
NUMBER OF DEVICE TYPES K
NUMBER OF CIRCUIT TYPES R

---

NUMBER OF DEMANDS D  NUMBER OF PHYSICAL LINKS L
NUMBER OF SITES M    NUMBER OF DEVICE TYPES K
NUMBER OF CIRCUIT TYPES R

DESIGN VARIABLE
$(K*M) + (2*D*R*L) + (2*R*L)$

Minimize
$$\sum_m \sum_k E_{m,k} Z_{m,k} + \sum_r \sum_{(i,j)} P_r Y_{r,(i,j)}$$

subject to

D*M UNITS
$$\sum_r \left( \sum_j X_{r,(i,j)}^{(s,d)} - \sum_j X_{r,(j,i)}^{(s,d)} \right) = \begin{cases} 1 & \forall (s,d), i=s \\ -1 & \forall (s,d), i=d \\ 0 & \forall (s,d), i \neq s,d \end{cases}$$

R*L*D UNITS
$$X_{r,(i,j)}^{(s,d)} + X_{r,(j,i)}^{(s,d)} \leq W_{r,(i,j)} \quad \forall r, (s,d), (i,j) \in E$$

L UNITS
$$\sum_r W_{r,(i,j)} \leq H^{(s,d)} \quad \forall (s,d)$$

D UNITS
$$\sum_r \sum_j X_{r,(i,j)}^{(s,d)} \leq 1 \quad \forall (s,d)$$

M UNITS
$$\sum_k Z_{m,k} \leq 1 \quad \forall m$$

L UNITS
$$\sum_r (L_r \cdot Y_{r,(m,j)}) - \sum_{(s,d)} B^{(s,d)} X_{r,(m,j)}^{(s,d)} \geq T_{m,j} \quad \forall (m,j)$$

L UNITS
$$\sum_r (L_r \cdot Y_{r,(j,m)}) - \sum_{(s,d)} B^{(s,d)} X_{r,(j,m)}^{(s,d)} \geq T_{j,m} \quad \forall (m,j)$$

R*M UNITS
$$\sum_j Y_{r,(m,j)} \leq \sum_k p_{r,k} Z_{m,k} - D_{r,m} \quad \forall r, m$$

R*L UNITS
$$Y_{r,(i,j)} \leq 1000 W_{r,(i,j)} \quad \forall r, (i,j) \in E$$

R*L UNITS
$$Y_{r,(i,j)} \leq LA_{r,(i,j)} \quad \forall r, (i,j) \in E$$

CONSTRAINTS

- TARGET PROBLEM SCALE (INPUT) IN ASSUMED EXECUTION ENVIRONMENT
  - NUMBER OF DESIGN VARIABLES
  - NUMBER OF CONSTRAINTS
- ESTIMATE OF NUMBER OF SIMULTANEOUS DESIGN DEMANDS
  - CONDITION 1 (DESIGN VARIABLE RESTRICTION)
    - $(K*M)+(2*D*R*L)+(R*2L) < X$
  - CONDITION 2 (RESTRICTION OF CONSTRAINTS)
    - $D*[M+(R*L)+1]+L+M+(2*L)+(R*M)+(2*R*L) < Y$

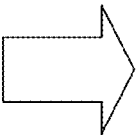

NUMBER OF DEMANDS D
NUMBER OF PHYSICAL LINKS L
NUMBER OF SITES M
NUMBER OF DEVICE TYPES K
NUMBER OF CIRCUIT TYPES R

⇒ RECURSIVELY REPEATING ACCOMMODATION DESIGN OF PLURAL DEMANDS WITH MAXIMUM NUMBER OF DEMANDS SATISFYING CONDITIONS 1 AND 2

FIG. 13

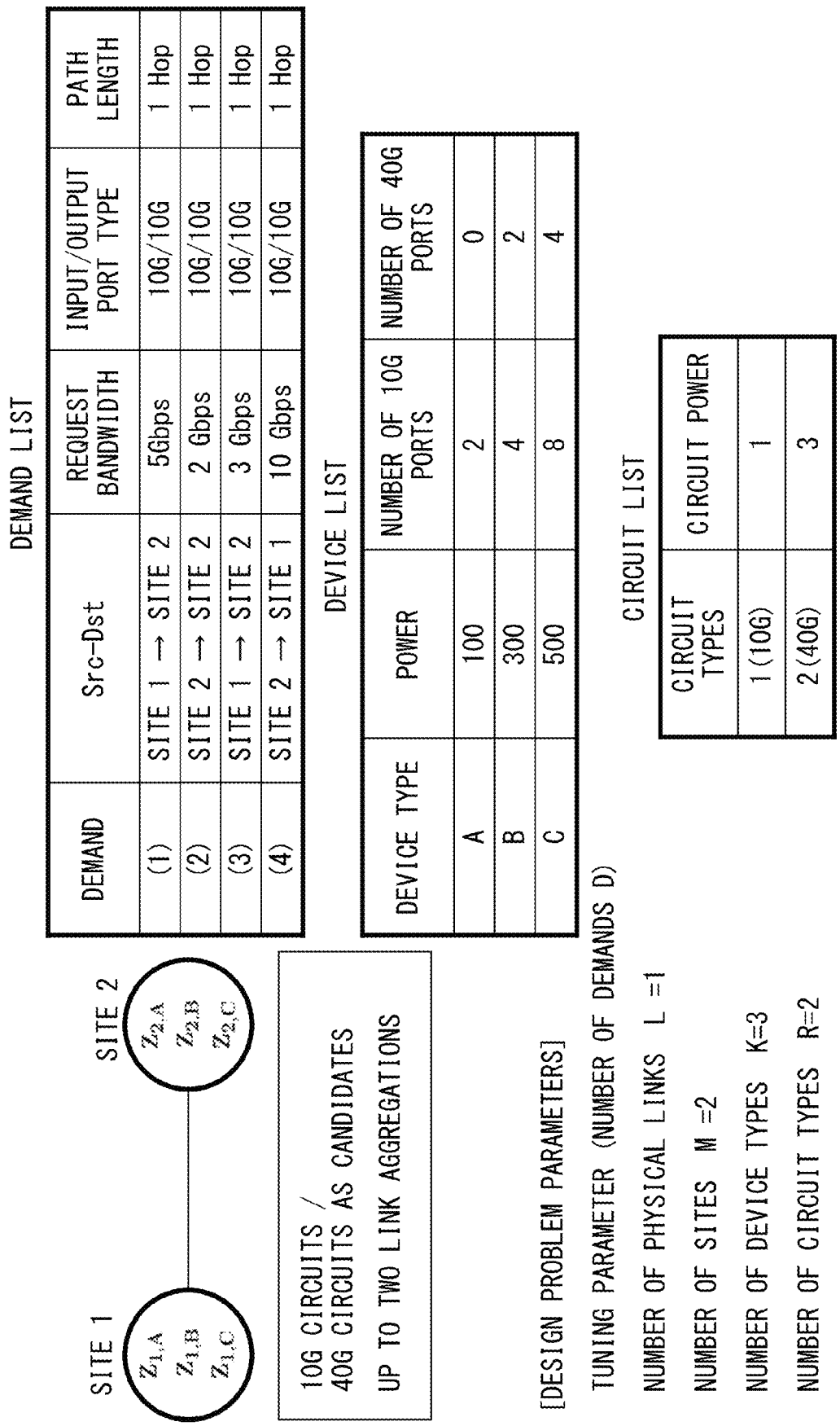
F I G. 14

$$\text{Minimize} \sum_m \sum_k E_{m,k} Z_{m,k} + \sum_r \sum_{(i,j)} P_r Y_r(i,j)$$

| | | | | | | | | | | | (1) | | | | (2) | | | |
|---|---|---|---|---|---|---|---|---|---|---|---|---|---|---|---|---|---|---|
| | Z1_A | Z1_B | Z1_C | Z2_A | Z2_B | Z2_C | Y1 | Y2 | W1 | W2 | X1(1,2) | X1(2,1) | X2(1,2) | X2(2,1) | X1(1,2) | X1(2,1) | X2(1,2) | X2(2,1) |
| OBJECTIVE FUNCTION | 100 | 300 | 500 | 100 | 300 | 500 | 500 | 1 | 3 | | 0 | 0 | 0 | 0 | 0 | 0 | 0 | 0 |
| VARIABLE TYPE | Binary | Binary | Binary | Binary | Binary | Binary | Integer | Integer | Binary | Binary | Binary | Binary | Binary | Binary | Binary | Binary | Binary | Binary |

HOP COUNT CONSTRAINT $$\sum_{r}\sum_{ij} x_{r,(i,j)}^{(s,d)} \leq H^{(s,d)} \quad \forall (s,d)$$

| DEMAND | Z1A | Z1B | Z1C | Z2A | Z2B | Z2C | Y1 | Y2 | W1 | W2 | (1) X1(1,2) | X2(2,1) | X2(1,2) | X1(1,2) | (2) X1(2,1) | X2(2,1) | X2(1,2) | X1(1,2) | X2(1,2) | INEQUAL-ITY | RIGHT SIDE |
|---|---|---|---|---|---|---|---|---|---|---|---|---|---|---|---|---|---|---|---|---|---|
| (1) | 0 | 0 | 0 | 0 | 0 | 0 | 0 | 0 | 0 | 0 | 1 | 1 | 1 | 1 | 0 | 0 | 0 | 0 | 0 | ≤ | 1 |
| (2) | 0 | 0 | 0 | 0 | 0 | 0 | 0 | 0 | 0 | 0 | 0 | 0 | 0 | 0 | 1 | 1 | 1 | 1 | 1 | ≤ | 1 |

DEVICE SELECTION CONSTRAINT $$\sum_{k} z_{m,k} \leq 1 \quad \forall m$$

| BASE | Z1A | Z1B | Z1C | Z2A | Z2B | Z2C | Y1 | Y2 | W1 | W2 | (1) X1(1,2) | X2(2,1) | X2(1,2) | X1(1,2) | (2) X1(2,1) | X2(2,1) | X2(1,2) | X1(1,2) | X2(1,2) | INEQUAL-ITY | RIGHT SIDE |
|---|---|---|---|---|---|---|---|---|---|---|---|---|---|---|---|---|---|---|---|---|---|
| 1 | 1 | 1 | 1 | 0 | 0 | 0 | 0 | 0 | 0 | 0 | 0 | 0 | 0 | 0 | 0 | 0 | 0 | 0 | 0 | ≤ | 1 |
| 2 | 0 | 0 | 0 | 1 | 1 | 1 | 0 | 0 | 0 | 0 | 0 | 0 | 0 | 0 | 0 | 0 | 0 | 0 | 0 | ≤ | 1 |

F I G. 19

DEVICE PORT NUMBER CONSTRAINT $$\sum_{r}\{L_r Y_{r,(m,j)} - \sum_{(s,d)} B^{(s,d)} X^{(s,d)}_{r,(m,j)}\} \geq T_{m,j} \quad \forall (m,j)$$

$$\sum_{r}\{L_r Y_{r,(m,j)} - \sum_{(s,d)} B^{(s,d)} X^{(s,d)}_{r,(m,j)}\} \geq T_{m,j} \quad \forall (m,j)$$

$$\sum_{j} Y_{r,(m,j)} \leq \sum_{k} p_{r,k} Z_{m,k} - D_{r,m} \quad \forall r,m$$

FIG. 20

CONSTRAINT FOR GUARANTEE OF UNIQUENESS OF CIRCUIT TYPE $$Y_{r,(i,j)} \leq 1000 W_{r,(i,j)} \quad \forall r, (i,j) \in E$$

| CIRCUIT TYPE r | Z1_A | Z1_B | Z1_C | Z2_A | Z2_B | Z2_C | Y1 | Y2 | W1 | W2 | (1) X1(1,2) | X2(1,2) | X1(2,1) | X2(2,1) | INEQUALITY | RIGHT SIDE |
|---|---|---|---|---|---|---|---|---|---|---|---|---|---|---|---|---|
| 1 | 0 | 0 | 0 | 0 | 0 | 0 | 0 | 0 | -1000 | 0 | 0 | 0 | 0 | 0 | ≤ | 0 |
| 2 | 0 | 0 | 0 | 0 | 0 | 0 | 0 | 1 | 0 | -1000 | 0 | 0 | 0 | 0 | ≤ | 0 |

LINK AGGREGATION NUMBER CONSTRAINT $$Y_{r,(i,j)} \leq LA_{r,(i,j)} \quad \forall r, (i,j) \in E$$

| CIRCUIT TYPE r | Z1_A | Z1_B | Z1_C | Z2_A | Z2_B | Z2_C | Y1 | Y2 | W1 | W2 | (1) X1(1,2) | X2(1,2) | X1(2,1) | X2(2,1) | INEQUALITY | RIGHT SIDE |
|---|---|---|---|---|---|---|---|---|---|---|---|---|---|---|---|---|
| 1 | 0 | 0 | 0 | 0 | 0 | 0 | 1 | 0 | 0 | 0 | 0 | 0 | 0 | 0 | ≤ | 2 |
| 2 | 0 | 0 | 0 | 0 | 0 | 0 | 0 | 1 | 0 | 0 | 0 | 0 | 0 | 0 | ≤ | 2 |

F I G. 2 1

F I G. 22

$$\text{Minimize} \sum_{m}\sum_{k} E_{m,k} Z_{m,k} + \sum_{r}\sum_{(i,j)} P_r Y_{r,(i,j)}$$

| OBJECTIVE FUNCTION | Z1.A | Z1.B | Z1.C | Z2.A | Z2.B | Z2.C | Y1 | Y2 | W1 | W2 | X1(1,2) | X1(2,1) | X2(1,2) | X2(2,1) | X1(2,1) | X1(1,2) | X2(2,1) | X2(1,2) |
|---|---|---|---|---|---|---|---|---|---|---|---|---|---|---|---|---|---|---|
|  | 100 | 300 | 300 | 100 | 300 | 300 | 300 | 300 | 3 | 0 | 0 | 0 | 0 | 0 | 0 | 0 | 0 | 0 |
| VARIABLE TYPE | Binary | Binary | Binary | Binary | Binary | Binary | Integer | Integer | Binary | Binary | Binary | Binary | Binary | Binary | Binary | Binary | Binary | Binary |

(3) (4)

F I G. 2 3

FLOW CONSERVATION LAW $$\sum_r \left( \sum_j X_{r,(ij)}^{(s,d)} - \sum_j X_{r,(ji)}^{(s,d)} \right) = \begin{cases} 1 & \forall (s,d), i = s \\ -1 & \forall (s,d), i = d \\ 0 & \forall (s,d), i \neq s,d \end{cases}$$

PORT TYPE CONSTRAINT $$X_{r,(ij)}^{(s,d)} + X_{r,(ji)}^{(s,d)} \leq W_{r,(i,j)} \quad \forall r, (s,d), (i,j) \in E$$

$$\sum_r W_{r,(i,j)} \leq 1 \quad \forall (i,j) \in E$$

FIG. 24

HOP COUNT CONSTRAINT $$\sum_r \sum_{ij} x_{r,(ij)}^{(s,d)} \leq H^{(s,d)} \quad \forall (s,d)$$

| | | | (3) | | | | | | | | | (4) | | | | | INEQUAL-ITY | RIGHT SIDE |
|---|---|---|---|---|---|---|---|---|---|---|---|---|---|---|---|---|---|---|
| DEMAND | Z1,A | Z1,B | Z1,C | Z2,A | Z2,B | Z2,C | Y1 | Y2 | W1 | W2 | X1(1,2) | X1(2,1) | X2(1,2) | X2(2,1) | X1(2,1) | X1(1,2) | X2(2,1) | |
| (3) | 0 | 0 | 0 | 0 | 0 | 0 | 0 | 0 | 0 | 0 | 1 | 1 | 0 | 0 | 0 | 1 | ≤ | V8 | 1 |
| (4) | 0 | 0 | 0 | 0 | 0 | 0 | 0 | 0 | 0 | 0 | 0 | 1 | 1 | 0 | 1 | 0 | ≤ | V8 | 1 |

DEVICE SELECTION CONSTRAINT $$\sum_k z_{m,k} \leq 1 \quad \forall m$$

| | | | (3) | | | | | | | | | (4) | | | | | INEQUAL-ITY | RIGHT SIDE |
|---|---|---|---|---|---|---|---|---|---|---|---|---|---|---|---|---|---|---|
| BASE | Z1,A | Z1,B | Z1,C | Z2,A | Z2,B | Z2,C | Y1 | Y2 | W1 | W2 | X1(1,2) | X1(2,1) | X2(1,2) | X2(2,1) | X1(2,1) | X1(1,2) | X2(2,1) | | |
| 1 | 1 | 1 | 1 | 0 | 0 | 0 | 0 | 0 | 0 | 0 | 0 | 0 | 0 | 0 | 0 | 0 | ≤ | V8 | 1 |
| 2 | 0 | 0 | 0 | 1 | 1 | 1 | 0 | 0 | 0 | 0 | 0 | 0 | 0 | 0 | 0 | 0 | ≤ | V8 | 1 |

FIG. 25

DEVICE PORT NUMBER CONSTRAINT $$\sum_r \{L_r Y_{r,(m,j)}\} - \sum_{(s,d)} B^{(s,d)} X^{(s,d)}_{r,(m,j)} \geq T_{m,j} \quad \forall (m,j)$$

| | Z1.A | Z1.B | Z1.C | Z2.A | Z2.B | Z2.C | Y1 | Y2 | W1 | W2 | (3) X1(1,2) | (4) X1(2,1) X1(1,2) X2(1,2) X2(2,1) | -1TY | INEQUAL-ITY | RIGHT SIDE |
|---|---|---|---|---|---|---|---|---|---|---|---|---|---|---|---|
| | 0 | 0 | 0 | 0 | 0 | 0 | 100 | 0 | 40 | 0 | 0 | -3 | 0 | -10 | 0 | ≥ | 30 |
| | 0 | 0 | 0 | 0 | 0 | 0 | 0 | 0 | 0 | 0 | 0 | 0 | 0 | 0 | 0 | | |

FIRST DESIGN STATE $$\sum_r B^{(s,d)} X^{(s,d)}_{r,(j,u)} \geq T_{j,u} \quad (j,u)$$

| | Z1.A | Z1.B | Z1.C | Z2.A | Z2.B | Z2.C | Y1 | Y2 | W1 | W2 | (3) X1(1,2) | (4) X1(2,1) X1(1,2) X2(1,2) X2(2,1) | INEQUAL-ITY | RIGHT SIDE |
|---|---|---|---|---|---|---|---|---|---|---|---|---|---|---|
| | 0 | 0 | 0 | 0 | 0 | 0 | 100 | 0 | 40 | 0 | 0 | -3 | 0 | -10 | ≥ | 2 |

FIRST DESIGN STATE $$\sum_j Y_{r,(m,j)} \leq \sum_k p_{r,k} Z_{m,k} - O_{r,m} \quad \forall r, m$$

| CIRCUIT TYPE r | BASE | Z1.A | Z1.B | Z1.C | Z2.A | Z2.B | Z2.C | Y1 | Y2 | W1 | W2 | (3) | (4) X1(1,2) X1(2,1) X1(1,2) X2(1,2) X2(2,1) | INEQUAL-ITY | RIGHT SIDE |
|---|---|---|---|---|---|---|---|---|---|---|---|---|---|---|---|
| 1 | | | | | | | | | | | | | | ≤ | |
| 2 | | | | | | | | | | | | | | ≤ | |

FIRST DESIGN STATE

FIG. 26

CONSTRAINT FOR GUARANTEE OF UNIQUENESS OF CIRCUIT TYPE $$Y_{r,(i,j)} \leq 1000 W_{r,(i,j)} \quad \forall r, (i,j) \in E$$

| CIRCUIT TYPE r | Z1_A | Z1_B | Z1_C | Z2_A | Z2_B | Z2_C | Y1 | Y2 | W1 | W2 | (3) X1(1,2) | X2(1,2) | Y2(2,1) | X1(1,2) | (4) X1(2,1) | X2(1,2) | X2(2,1) | INEQUALITY | RIGHT SIDE |
|---|---|---|---|---|---|---|---|---|---|---|---|---|---|---|---|---|---|---|---|
| 1 | 0 | 0 | 0 | 0 | 0 | 0 | 1 | 0 | -1000 | 0 | 0 | 0 | 0 | 0 | 0 | 0 | 0 | ≤ | 0 |
| 2 | 0 | 0 | 0 | 0 | 0 | 0 | 0 | 1 | 0 | -1000 | 0 | 0 | 0 | 0 | 0 | 0 | 0 | ≤ | 0 |

LINK AGGREGATION NUMBER CONSTRAINT $$Y_{r,(i,j)} \leq LA_{r,(i,j)} \quad \forall r, (i,j) \in E$$

| CIRCUIT TYPE r | Z1_A | Z1_B | Z1_C | Z2_A | Z2_B | Z2_C | Y1 | Y2 | W1 | W2 | (3) X1(1,2) | X2(1,2) | Y2(2,1) | X1(1,2) | (4) X1(2,1) | X2(1,2) | X2(2,1) | INEQUALITY | RIGHT SIDE |
|---|---|---|---|---|---|---|---|---|---|---|---|---|---|---|---|---|---|---|---|
| 1 | 0 | 0 | 0 | 0 | 0 | 0 | 1 | 0 | 0 | 0 | 0 | 0 | 0 | 0 | 0 | 0 | 0 | ≤ | 2 |
| 2 | 0 | 0 | 0 | 0 | 0 | 0 | 0 | 1 | 0 | 0 | 0 | 0 | 0 | 0 | 0 | 0 | 0 | ≤ | 2 |

FIG. 27

NETWORK DESIGN DEVICE

CROSS-REFERENCE TO RELATED APPLICATIONS

This application is based upon and claims the benefit of priority of the prior Japanese Patent Application No. 2011-256397, filed on Nov. 24, 2011, the entire contents of which are incorporated herein by reference.

FIELD

The following embodiment relates to a network design device.

BACKGROUND

With increasing traffic entering a network, a network device becomes larger and higher in performance, thereby causing larger power consumption and higher cost.

On the other hand, in the current network, excess circuits and devices are arranged to accommodate traffic in many cases, and it is expected that the optimum arrangement of circuits and devices may realize power saving and lower cost of the entire network (hereafter referred to as cost including power and amount of money). However, since the appropriate arrangement of circuits and devices depends on the traffic transfer state (path route), it is important to totally consider the arrangement of the traffic path, circuits, devices, etc. to derive a cost-saving network configuration.

On the other hand, with the network design by conventional labor, there is the problem that it is hard to design a network for process a large number of parameters by considering the dependence among various design elements (path, circuit, device, etc.). Therefore, the technology of automatically designing a network configuration for minimum power (lowest cost, or the minimum cost totally) is requested by generating a systematic design process with each design element taken into account.

There is the conventional technology described in the non-patent document 1 as a system published lately to perform automated and integral designing for a traffic transfer path and a network device configuration.

This document discloses a method of designing a network by solving a mathematical programming problem by performing traffic flow design to each path candidate and chassis configuration design so that the amount of power consumption may be minimized for the device configuration accommodating a traffic demand.

However, the prior art has the following problem.
1. The network design may not be performed with various path configuration patterns and port use modes taken into account.

Since the smallest link cost path regulated by routing protocol is assumed for each site connection, the path search range is limited, the port type having various transfer rates may not be selected, or detailed port use modes such as link aggregation etc.
2. A design arithmetic operation is not performed in a large network.

There is a large design problem, and a design arithmetic operation may not be realized depending on the performance of the machine for performing arithmetic operations and the performance of the software (solver) for solving the mathematical programming problem.

Therefore, the prior art has no function of performing the integral designing of a device by considering various path states and port use modes, and it is very hard to perform designing arithmetic operations in a practical time period in solving the design problem with a large real network environment. The practical time period refers to the time period appropriate for performing a practical operation as the time required for network design. For example, a practical time period refers to one day or several hours. When a longer time is taken by the operation using a network design device than by manual labor in performing a practical network designing operation, it is not a practical time period.

The prior art may provide a demand as a probability variable, generates a probable constraint, and performs network design as a mathematical programming problem.

DOCUMENT OF PRIOR ART

Patent Document

[Patent Document 1] Japanese Laid-open Patent Publication No. 11-215124

Non-Patent Document

[Non-patent Document 1] J. Chabarek et. al, "Power Awareness in Network Design and Routing", INFOCOM 2008, pp. 457-465, 2008

SUMMARY

The network design device according to an aspect of the following embodiments includes: an adjustment unit to derive the number of simultaneous design demands so that the number of design variables and the number of constraints indicating the problem scale in the network design problem designed as a mathematical programming problem in which a plurality of traffic demands are accommodated in a target network for each section between given starting site and ending site may be within an upper limit of the number of design variables and number of constraints based on the performance of a solver for solving the network design problem; and a design unit provided with the solver and to perform a network design arithmetic operation for each of the derived numbers of simultaneous design demands.

According to the following embodiments, a network design device capable of performing an arithmetic process of network design of the smallest cost in a practical time period is provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a block diagram of a configuration of a network design device according to an embodiment of the present invention;

FIG. 2 is an explanatory view of the network design process according to an embodiment of the present invention;

FIG. 5 is an explanatory view (part 3) about a method of solving network design as a mathematical programming problem according to an embodiment of the present invention;

FIG. 6 is an explanatory view (part 4) about a method of solving network design as a mathematical programming problem according to an embodiment of the present invention;

FIG. 9 is an explanatory view (part 3) of the optimality of the solution of a mathematical programming problem and a problem scale;

FIG. 10 is a flowchart (part 1) of the process of the network design device according to an embodiment of the present invention;

FIG. 11 is a flowchart (part 2) of the process of the network design device according to an embodiment of the present invention;

FIG. 12 is an explanatory view (part 1) of the method of deriving a problem scale and dividing a problem scale;

FIG. 13 is an explanatory view (part 2) of the method of deriving a problem scale and dividing a problem scale;

FIG. 14 is an explanatory view (part 1) of setting a problem in concrete explanation by the operation according to an embodiment of the present invention;

FIG. 17 is a view (part 1) of an example of concrete data of accommodation design of a path demand;

Figure 18:
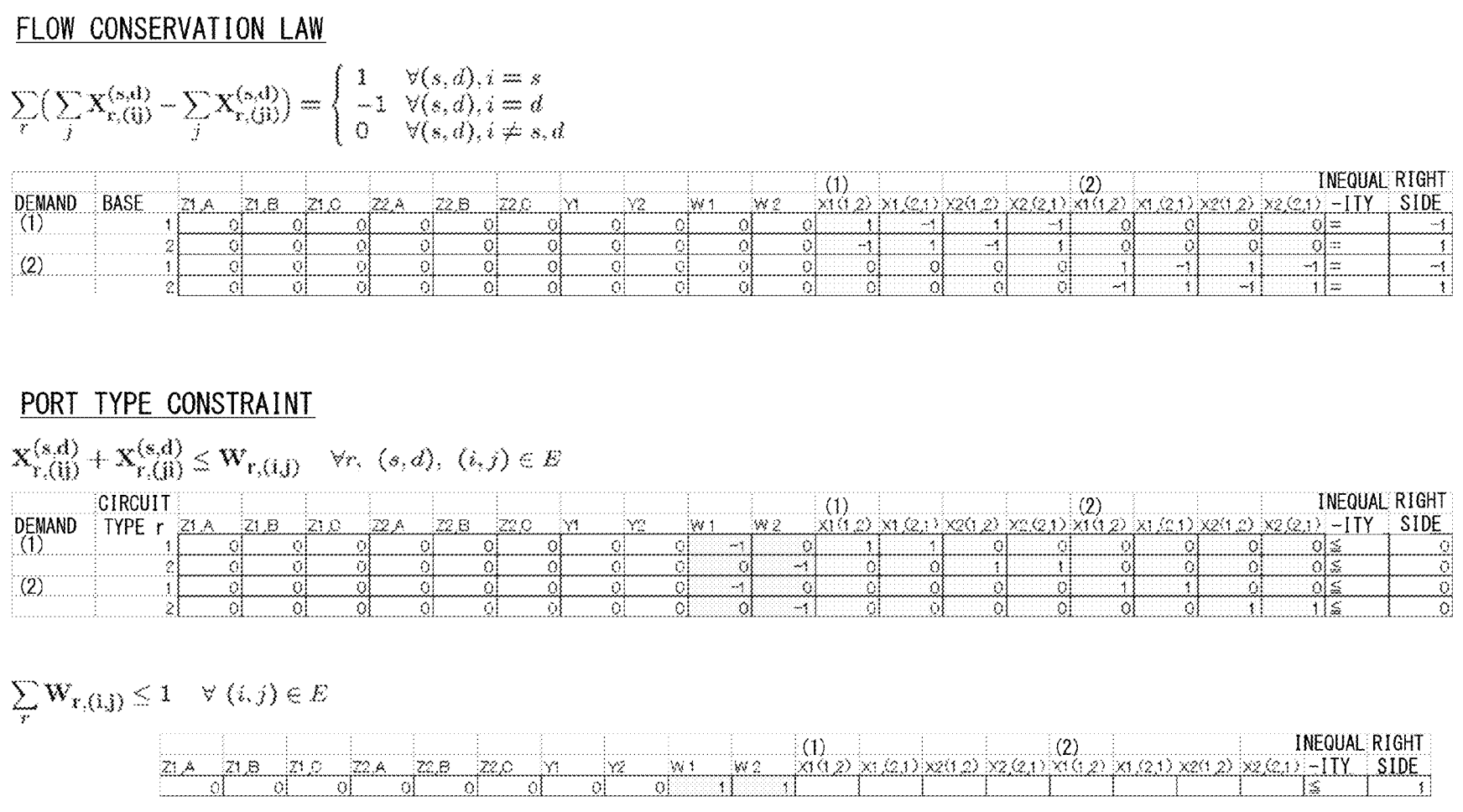

FIG. 18 is a view (part 2) of an example of concrete data of accommodation design of a path demand;

FIG. 19 is a view (part 3) of an example of concrete data of accommodation design of a path demand;

FIG. 20 is a view (part 4) of an example of concrete data of accommodation design of a path demand;

FIG. 21 is a view (part 5) of an example of concrete data of accommodation design of a path demand;

FIG. 22 is a view (part 6) of an example of concrete data of accommodation design of a path demand;

FIG. 23 is a view (part 7) of an example of concrete data of accommodation design of a path demand;

FIG. 24 is a view (part 8) of an example of concrete data of accommodation design of a path demand;

FIG. 25 is a view (part 9) of an example of concrete data of accommodation design of a path demand;

FIG. 26 is a view (part 10) of an example of concrete data of accommodation design of a path demand;

FIG. 27 is a view (part 11) of an example of concrete data of accommodation design of a path demand;

DESCRIPTION OF EMBODIMENTS

Figure 3:
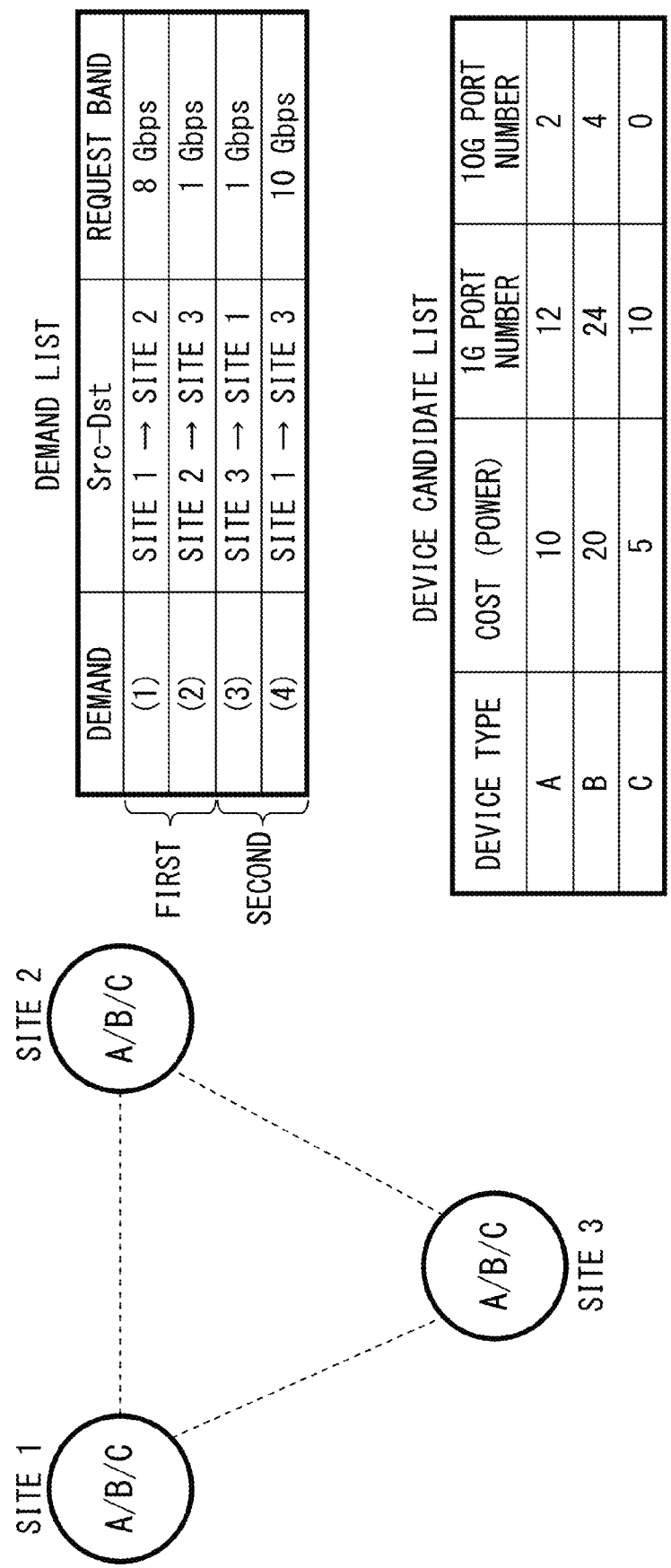
FIG. 3 is an explanatory view (part 1) about a method of solving network design as a mathematical programming problem according to an embodiment of the present invention.

The present embodiment provides a network design device for simultaneously designing the method of using the device configuration, path, and physical port (link aggregation) for the minimum power and the lowest amount (minimum cost) when a path demand between the sites is accommodated.

According to an aspect of the network design device of the present embodiment includes, for example, a design unit, an adjustment unit, a model generation unit, and a derivation unit.

Using the information about a request bandwidth of a path newly requested between the starting site and the ending site of a request path, the type of device candidate which may be mounted at each site, and the information about the number of ports of each device, the design unit sets an objective function indicating a device cost and a constraint to be considered when the objective function is minimized.

The adjustment unit sets a problem scale depending on the arithmetic performance for design.

The model generation unit generates a mathematical programming problem for minimizing objective function under the constraint obtained from the setting unit based on the upper limit of the number of simultaneously designed paths set by the problem scale specified by the adjustment unit.

The derivation unit obtains a solution of a problem acquired from the model generation unit, and repeats performing accommodation design for a plurality of paths until the design of all requested paths are completed, thereby deriving a method of arranging each path, a method of arranging each device, and the number of ports to be used.

FIG. 1 is a block diagram of a configuration of a network design device according to the present embodiment.

In FIG. 1, an operator setting unit 10 allows an operator who performs network design to input necessary information for network design, and view the network state of a target network 12. A network design management unit 11 receives the input from the operator setting unit 10, and displays the result of a network designing arithmetic operation on the operator setting unit 10. The network design management unit 11 receives the network state from the target network 12, and transmits it to the operator setting unit 10. The target network 12 is an object network on which the network designing arithmetic operation is performed, and a path is set for the network based on the result of the network designing arithmetic operation. The path of the target network 12 may be manually set by an operator after obtaining the result of the network designing arithmetic operation. Otherwise, the operator may transmit a command from the operator setting unit 10 to automatically set a path of the target network 12 through a path setting unit 23 of the network design management unit 11.

The network design management unit 11 is provided with a network state measurement unit 15 for measuring the state of the target network 12. After measuring the state of the target network 12, the network state measurement unit 15 stores the state of the measured path in a path management unit 13, and the state of the use of a device in a device management unit 14.

When the condition of the network design is set in the operator setting unit 10, an arithmetic performance setting unit 16 acquires the arithmetic performance of an NW (network) design unit 22 such as a solver of a linear programming problem etc., and set it as a parameter of network design. A path request (path demand) setting unit 17 sets a path requested according to a traffic demand input from the operator setting unit 10. A device candidate setting unit 18 sets a candidate for a device available to accommodate the traffic demand input from the operator setting unit 10.

An adjustment unit 19 selects the number of path requests which is simultaneously calculated in a practical time period from the arithmetic performance set by the arithmetic performance setting unit 16. An objective function setting unit 20 sets an objective function of a mathematical programming problem corresponding to the network design to be performed. A constraint setting unit 21 sets the constraint of the mathematical programming problem corresponding to the network design to be performed.

The NW design unit 22 is a solver etc. of a mathematical programming problem, and performs the network design by solving the mathematical programming problem based on the objective function set by the objective function setting unit 20 and the constraint set by the constraint setting unit 21. In this case, the number of the path requests processed by the NW design unit 22 in one arithmetic operation is limited to the number set by the adjustment unit 19. The NW design unit 22 performs an arithmetic operation on the number of path requests set by the adjustment unit 19, and repeats the arithmetic operation until all path requests are processed. The NW design unit 22 presents the operator with a result of the network design through the operator setting unit 10. The operator makes a setting to accommodate a traffic demand for the target network 12 based on the presented result of the network design manually or automatically through the path setting unit 23.

According to the present embodiment, a network design system capable of designing the path, the device, the number of available ports, etc. that minimize the cost for the path accommodation may be presented within a practical time period by considering the relationship between the upper limit of the number of ports of each device and the cost.

FIG. 2 is an explanatory view of the network design process according to the present embodiment.

As a selection problem of the device and the port which guarantee a traffic demand, the relationship among the traffic path, the link rate, and the number of ports to be used, and the constraint of the upper limit of the number of ports loaded into each device are formularized, and a network configuration that minimizes the total cost of the device to be arranged in each site is designed.

Furthermore, the design problem is described as a problem for minimizing an objective function under the constraint by setting the following conditional expression.

objective function] min {sum of the cost of the devices and ports arranged in each site},
 upper limit condition of the number of available ports of each device,
 condition of a device (only one device is arranged in each site) arranged in each site, etc.

These problems are referred to as mathematical programming problems, a matrix as a combination of an objective function which is a linear expression of a design variable and a constraint expression is generated, and the generated matrix is given as an input to the existing mathematical programming problem solver and an arithmetic operation is performed, thereby acquiring a value of each design variable.

Free software and commercial software are used as solvers for solving a mathematical programming problem. With the solvers, when an input which transforms the structures of a linear programming problem and an integer programming problem into the formats specified by the respective solvers is given, a design solution for optimizing (maximizing or minimizing) an objective function may be automatically calculated. There are the following software as a free solver.

GLPK:http://www.gnu.org/software/glpk/
 SCIP:http://scip/Zip.de
 lp-solve:http://lpsolve.sourceforge.net/5.5/

Hereafter, on the statistic calculation software referred to as R, an example of executing Rsymphony is described (R:http://www.cran.fyxm.net/web/packages/Rsymphony/index.html)

objective function
min x+9y+3z
constraint
x+2y+3z<=9
3x+2y+2z<=15

When the integer programming problem above is solved, the input data is given as follows.
f.obj<-c(1, 9, 3)
f.con<-matrix (c(1, 2, 3, 3, 2, 2), nrow=2, byrow=TRUE)
f.dir<-c("<=", "<=")
f.rhs<-c(9, 15)
Rsymphony_solve_LP(f.obj, f.con, f.dir, f.rhs, types=c("B", "B", "I"), max=TRUE)$solution As a result, the vector of "1, 1, 2" is output, and the solution is x=1, y=1, and z=2.

Thus, the value f.con obtained by expressing the coefficient by a matrix, the value f.dir obtained by expressing the signs of equality and inequality of the constraint expression by vectors, and the value f.rhs obtained by expressing the constant term of the constraint expression by a vector are generated for the value f.obj obtained by expressing the coefficient of the objective function as a vector, and the constraint expression obtained by transferring the term including the design variable to the left side. Then, by providing these values as arguments for the LP( ) function, the solution of the design variable for optimizing (maximizing max=TRUE or minimizing max=FALSE) the objective function may be obtained as a vector.

FIGS. 3 through 6 are explanatory views about a method of solving network design as a mathematical programming problem according to the present embodiment.

As illustrated in FIG. 3, assume that there is the problem of selecting the transfer path of each demand and the device to be arranged at each site from among the devices A, B, and C when the following four traffic demands are accommodated for the network connected by three sites.

(1) Amount of traffic of 8 Gbps from site 1 to site 2
(2) Amount of traffic of 1 Gbps from site 2 to site 3
(3) Amount of traffic of 1 Gbps from site 3 to site 1
(4) Amount of traffic of 10 Gbps from site 1 to site 3

Figure 4:
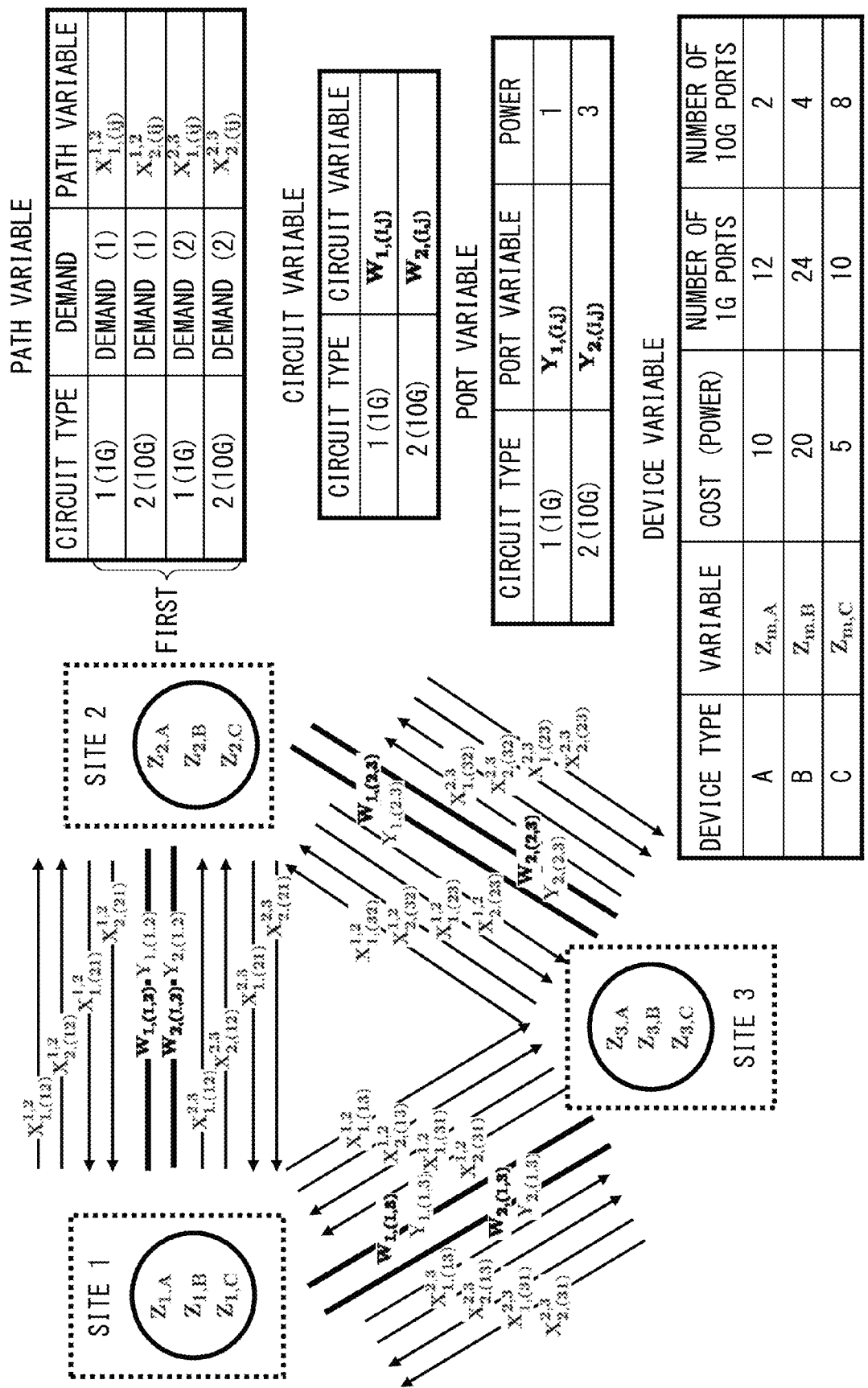
FIG. 4 is an explanatory view (part 2) about a method of solving network design as a mathematical programming problem according to an embodiment of the present invention.

For the design variable, the following data is defined as illustrated in FIGS. 4 and 5.

presence/absence of the use of a link through which the path of the path demand passes: $X \in \{0, 1\}$
 presence/absence of the use of a device: $Z \in \{0, 1\}$
 presence/absence of circuit selection: $W \in \{0, 1\}$
 number of ports to be used for each circuit: $Y \in$ integer (value set in advance in the designing process)

The subscripts to X, Z, and W are the number of each site, the type of circuit, identifier of device, etc. For example,
 $X^{s,d}_{r,(ij)}$ refers to a path demand between the starting point s and the ending point d, and indicates the presence/absence of the use of the link between the sites i and j of the circuit type r.

$Z_{m,k}$ indicates the presence/absence of the use of the device of the device type k at the site m.

$W_{r,(i,j)}$ indicates the presence/absence of the use of the circuit between the sites i and j of the circuit type r.

$Y_{r,(i,j)}$ indicates the number of ports to be used between the sites i and j of the circuit type r.

As illustrated in FIG. 6, by expressing the objective function and each constraint as formulas by the linear combination of these design variable, the path solution (X=0, 1) for optimizing the objective function, the device selection solution (Z=0, 1), and the number of ports to be used (Y∈integer) may be designated. The link variable X defined in this problem is to design the path including the transfer direction. That is, the link variable X is to define two one-directional link variables for one physical link, and the circuit selection variable and the use port number variable are defined for each circuit type for one physical link.

FIGS. 4 and 5 are examples of the definitions of a design variable when four path demands ((1), (2), (3), and (4)) are designed sequentially by dividing them into two ((1) and (2), and (3) and (4)).

In FIG. 4, the following variables are defined.

path variable X for each of the 1G and 10G circuit rates separately provided for the demands (1) and (2)

variable W of the circuit rate selected between the sites variable Y of the number of ports used between the sites device variable Z arranged at each site In FIG. 5, the following variables are defined.

path variable X for each of the 1G and 10G circuit rates separately provided for the demands (3) and (4)

variable W of the circuit rate selected between the sites variable Y of the number of ports used between the sites device variable Z arranged at each site In FIG. 5, the problem of additional accommodation of the demands (3) and (4) from the traffic path state designed in FIG. 4 is processed Then, as a mathematical programming problem, the problem is solved by a solver according to the following equation.

$$\text{Minimize} \sum_m \sum_k E_{m,k} Z_{m,k} + \sum_r \sum_{(i,j)} P_r Y_{r,(i,j)} \quad \text{[equation 1]}$$

Subject to $$\sum_r \left( \sum_j X_{r,(ij)}^{(s,d)} - \sum_j X_{r,(ji)}^{(s,d)} \right) = \begin{cases} 1 & \forall (s,d), i=s \\ -1 & \forall (s,d), i=d \\ 0 & \forall (s,d), i \neq s, d \end{cases}$$

$$X_{r,(ijh)}^{(s,d)} + X_{r,(ji)}^{(s,d)} \leq W_{r,(ij)} \forall r, (s,d), (i,j) \in E$$

$$\sum_r W_{r,(i,j)} \leq 1 \forall (i,j) \in E$$

$$\sum_r \sum_{ij} X_{r,(ij)}^{(s,d)} \leq H^{(s,d)} \forall (s,d)$$

$$\sum_k Z_{m,k} \leq 1 \forall m$$

-continued $$\sum_r \left\{ \begin{array}{l} L_r Y_{r,(m,j)} - \\ \sum_{(s,d)} B^{(s,d)} X_{r,(mj)}^{(s,d)} \end{array} \right\} \geq T_{mj} \forall (m,j)$$

$$\sum_r \left\{ L_r Y_{r,(m,j)} \leq \sum_{(s,d)} B^{(s,d)} X_{r,(jm)}^{(s,d)} \right\} \geq T_{jm} \forall (m,j)$$

$$\sum_j Y_{r,(m,j)} \leq \sum_k p_{r,k} Z_{m,k} - D_{r,m} \forall r, m$$

$$Y_{r,(i,j)} \leq 1000 W_{r,(i,j)} \forall r, (i,j) \in E$$

$$Y_{r,(i,j)} \leq LA_{r,(i,j)} \forall r, (i,j) \in E$$

The meanings of the equation above and each variable are collectively illustrated in FIG. 6. In the explanation of each variable, the use "Design" indicates a design variable, and "Given" indicates having a value provided when a problem is solved in advance.

Figure 7:
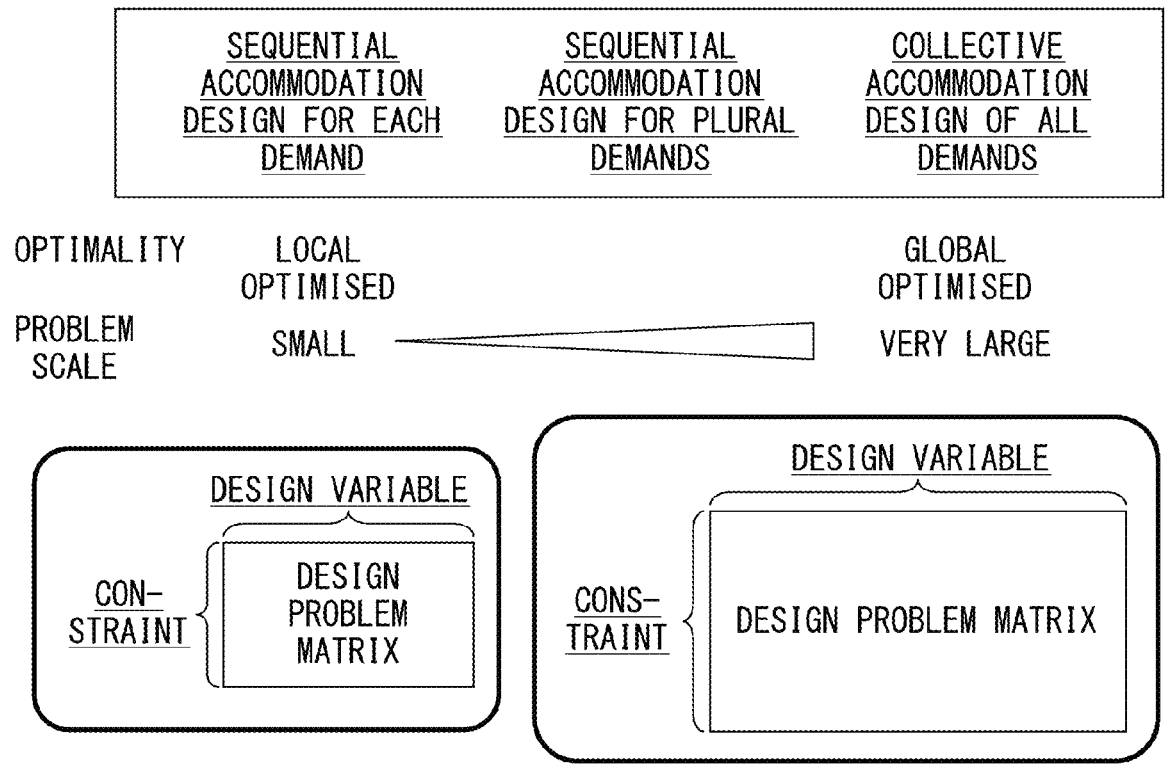
FIG. 7 is an explanatory view (part 1) of the optimality of the solution of a mathematical programming problem and a problem scale.
Figure 8:
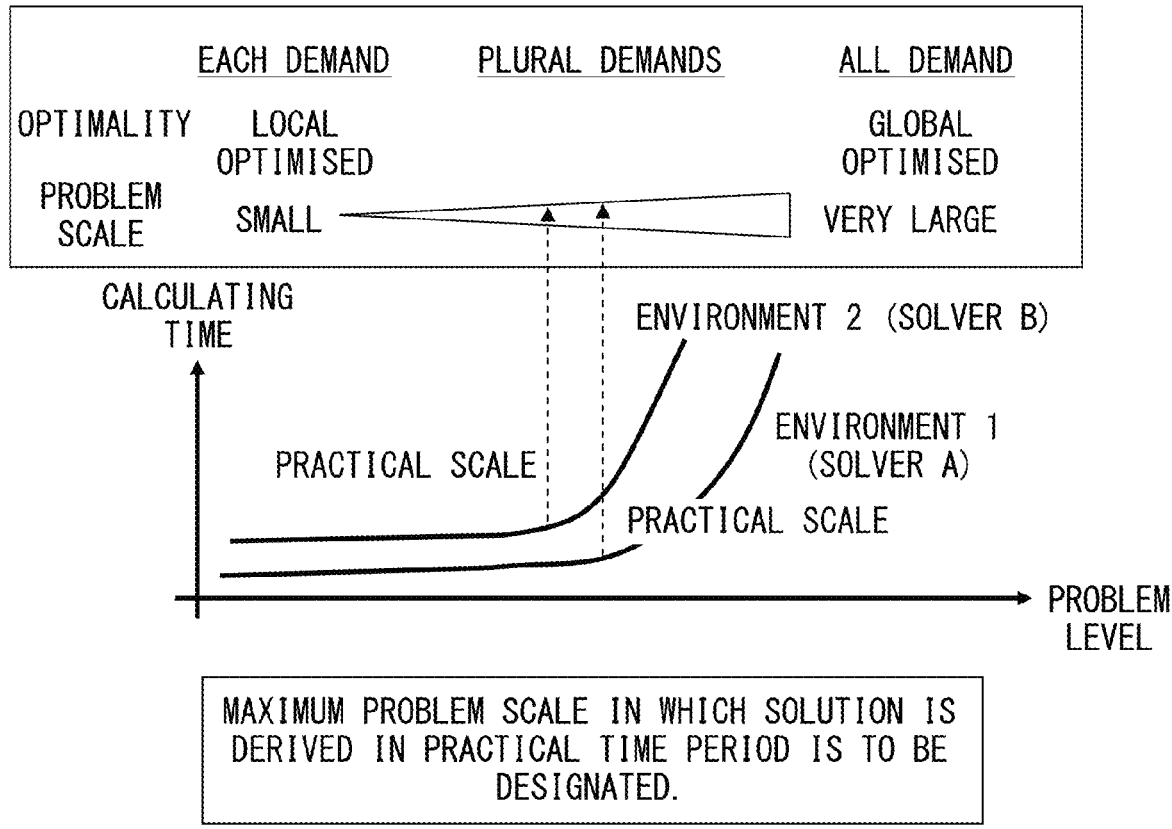
FIG. 8 is an explanatory view (part 2) of the optimality of the solution of a mathematical programming problem and a problem scale.

FIGS. 7 through 9 are explanatory views of the optimality of the solution of a mathematical programming problem and a problem scale.

These design problems are intended for the design by changing the number of simultaneously designed paths for a plurality of design path demands provided in advance. However, there is the relationship of tradeoff between the optimality of the design solution and the problem scale (calculating time) for the number of simultaneously designed paths as illustrated in FIG. 7.

For example, when one accommodation design is performed on a given path demand, the design problem matrix (matrix indicating the parameter given to a solver: column: total number of rows of design variables, row: number of constraints) to be solved as a mathematical programming problem may be smaller, and may be solved in a practical time period in a large network. However, depending on the design order of path demands, a network configuration of the lowest cost may not be derived.

On the other hand, when all given path demands are to be collectively designed, the derivation of the optimum (lowest-cost) network configuration is guaranteed, but the design problem matrix becomes very large, and may not be solved within a practical time period.

As illustrated in FIG. 8, the problem scale whose solution is derived in a practical time period (one hour, several hours, or at most one day) depends on the software environment (type of solver) for performing the mathematical programming operation. Therefore, to derive the optimum possible design solution within a practical time period, it is necessary to derive the appropriate number of simultaneously designed paths depending on the arithmetic environment.

Since there is a high probability that the optimum solution is obtained if a problem is solved as a large problem, it is preferable that a problem is solved as the largest possible problem within a practical time period. However, the calculating time exponentially increases if the problem exceeds a certain scale.

To derive the optimum possible solution within the practical calculating time, there is a method of changing the number of simultaneously designed paths within a possible calculating time as illustrated in FIG. 9, and obtaining the best solution before the problem exceeds an impossible size. However, in this method, a very large number of processes are required, and the size of the problem is not predicted before it exceeds the impossible size in a practical process, thereby taking a very long processing time.

Then, the condition under which a practical problem scale (number of design variables and constraints) is defined for each solver, and the number of simultaneously designed demands for the defined scale is derived in advance.

That is, the number of simultaneously designed paths is set so that the design problem may be calculated in a practical time period specified by the software (solver) for performing the mathematical programming operation for the network designing problem.

Then, the problem of designing the transfer path, the device, the port type and the number of use that minimize the amount of power for path accommodation while considering the relationship between the upper limit of the number of ports and cost of each device is automatically generated from the set number of simultaneously designed paths and the device candidate given in advance.

That is, the design arithmetic operation such as the transfer path, device, number of ports to be used, etc. that reduces the cost is performed by automatically dividing the network design into the appropriate problem scales depending on the arithmetic performance of the environment.

FIGS. 10 and 11 are flowcharts of the process of the network design device according to the present embodiment.

In step S10, the solver environment, that is, the problem scale which is solved by an available solver in a practical time period is acquired, and in step S11, the number of path demands which are solved by one arithmetic operation is set as a problem scale target value. From the problem scale target value, the upper limit number of the design variables and the upper limit number of the constraint expressions are decided. The upper limit number of the design variables is used in step S12. In addition, the upper limit number of the constraint expression is used in step S16.

On the other hand, in step S13, the network design condition is input, and in step S14, the equation of the number of columns is calculated on the design problem. In step S15, the equations of the number of rows are calculated on the design problem. The number of columns and the number of rows refer to those of the design problem matrix (matrix indicating the parameter given to a solver: column: total number of rows of design variables, row: number of constraints) to be solved by the mathematical programming problem. That is, in step S14, the equation described later relating to the number of design variables is calculated, and in step S15, the equation described later relating to the number of constraint is calculated.

The equation in step S14 is used in step S12, and the equation in step S15 is used in step S16. In step S12, a design variable inequalities are generated from the equations of the number of columns for the design problem and the number of upper limit of the design variables. In step S16, the constraint number inequalities are generated from the equations of rows for the design problem and the number of upper limit of the constraint expressions. Then, the number of simultaneous design demands is set in step S17 from the design variable inequalities in step S12 and the constraint number inequalities in step S16.

Then, in step S18, a path demand is read from the demand list, and a problem to be solved is generated. In step S19, the path demands of the number of simultaneous design demands are collectively accommodation-designed. In step S20, it is determined whether or not all path demands in the demand list have been designed. If the determination in step S20 is NO, the current network design state is updated to the design state in which a newly designed path demand is accommodated, and the design is performed back in step S19. If the determination in step S20 is YES, all path demands in the demand list have been completely designed, thereby terminating the process.

FIGS. 12 and 13 are explanatory views of the method of deriving a problem scale and dividing a problem scale.

In the software (solver) for performing a mathematical programming operation, the number of simultaneously designed paths is derived so that the design problem scale becomes to include the design variable and the number of constraints which may be calculated within a practical time period.

In the design problem in FIG. 12, when the number of demands D/number of physical links L/number of sites M/number of device types K/number of circuit types R are given as the design connections, the design problem scale is expressed as follows.

number of design variables $(K*M)+(2*D+R+L)+(2*R+L)$
number of constraints $D*[M+(R*L)+1]+L+M+(2*L)+(R*M)+(2*R*L)$ The variable parameter is only D, and L, M, K, and R are provided when the mathematical programming problem for accommodating the path demand is set. The number of design variables of $(K*M)$ refers to the number of $Z_{m, k}$, and $(2*D*R*L)$ refers to the number of $X^{(s, d)}_{r, (i,j)}$, and $(2*R*L)$ refers to the number of $W_{r, (i, j)}$ and $Y_{r, (I, j)}$.

As illustrated in FIG. 13, the number of path demands which may be simultaneously designed is estimated by the following equation under the condition given as follows for the maximum problem scale regulated for the software (solver) for solving the mathematical programming problem as illustrated in FIG. 13.

upper limit of design variables X
upper limit of constraints Y

The maximum number of simultaneously designed path demands satisfying the following conditions is derived.

Condition 1 (design variable restriction)
$(K*M)+(2*D*R*L)+(2R*L))<X$
Condition 2 (restriction of number of constraints)
$D*[M+(R*L)+1]+L+M+(2*L)+(R*M)+(2*R*L)<Y$ The solution of the problem is easily obtained by using the software for solving a normal linear equation.

As the problem for accommodating the specified number of plural paths, the relationship considered when the traffic path, the circuit rate, the number of ports to be used are designed for each path demand and the constraint condition on the upper limit of the number of ports loaded into each device are expressed as constants. Then, an "integer programming model" in which the network configuration indicating that the total cost of the device arranged in each site may be minimized is defined by the {0, 1} variable indicating the presence/absence of the selection of a path (link set), a device, and a circuit for each traffic demand, and the number of ports to be used in each link is generated.

Using the software (solver) for solving a mathematical programming problem, the path of the minimum cost is selected, the device of the minimum cost is selected, and the traffic path, the circuit rate, and the number of ports to be used are designed. Furthermore, the integer programming model is repeatedly generated and solved by a solver until all path demands provided in advance are accommodation designed.

Figure 15:
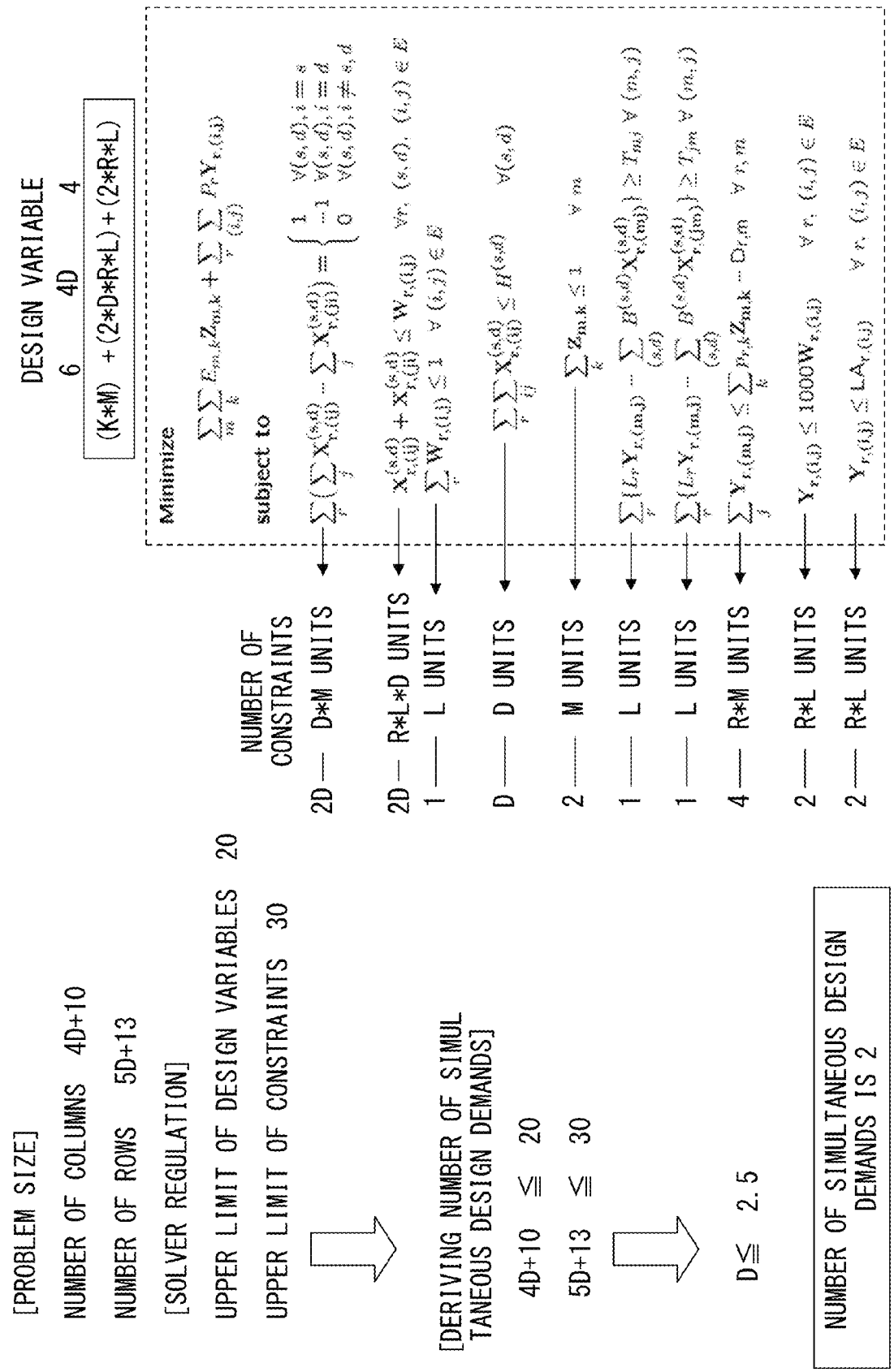
FIG. 15 is an explanatory view (part 2) of setting a problem in concrete explanation by the operation according to an embodiment of the present invention.
Figure 16:
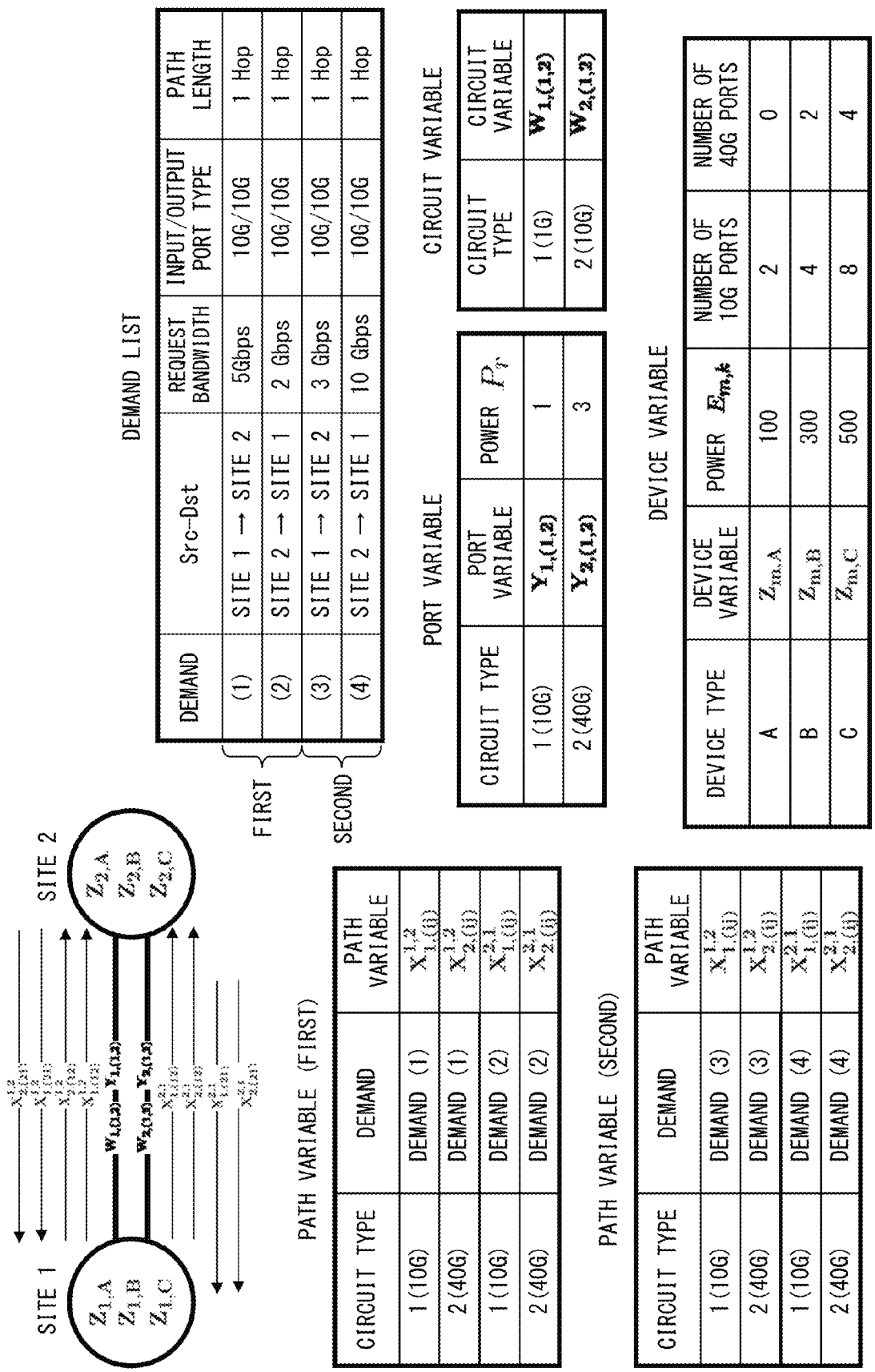
FIG. 16 is an explanatory view (part 3) of setting a problem in concrete explanation by the operation according to an embodiment of the present invention.

FIGS. 14 through 16 are explanatory views of setting a problem in concrete explanation by the operation according to the present embodiment.

In FIG. 14, the device and circuit of the minimum cost are selected and the traffic transfer path is designed when a given traffic demand is accommodated in a network in which two sites are connected.

Four demand information is provided for the demand list.
(1) Demand from site 1 to site 2

At the request bandwidth of 5 Gbps, a 10G port is used as the entry port and exit port, and the path length is the length of the shortest path.

(2) Demand from site 2 to site 1

At the request bandwidth of 2 Gbps, a 10G port is used as the entry port and exit port, and the path length is the length of the shortest path.

(3) Demand from site 1 to site 2

At the request bandwidth of 3 Gbps, a 10G port is used as the entry port and exit port, and the path length is the length of the shortest path.

(4) Demand from site 2 to site 1

At the request bandwidth of 10 Gbps, a 10G port is used as the entry port and exit port, and the path length is the length of the shortest path.

As a circuit candidate, 10G and 40G are considered, and the respective circuit power is 1 W and 3W.

In the link between the sites, it is assumed that the upper limit of the number of aggregations is two or less.

Furthermore, the information about the device which may be arranged at each site comes in the following three types.

device A: power 100W 10G port 2 40G port 0
device B: power 300W 10G port 4 40G port 2
device C: power 500W 10G port 8 40G port 4

The parameters for providing a design problem in the present concrete example are listed below.

number of physical links L=1
number of sites M=2
number of device types K=3
number of circuit types R=2

Therefore, as illustrated in FIG. 15, the scale of the present problem is expressed as follows using the number D of simultaneous design demands number of columns (number of design variables) 4D+10
number of rows (number of constraints) 5D+13

On the other hand, if the available solver is provided with "20 as the number of design variables, and 30 as the number of constraints" as the condition of the problem scale when it solves the present design problem, then the number D of simultaneous design demands is the maximum value satisfying the following inequalities.

4D+10≤20
5D+13≤30

The linear inequality is solved by the software for processing the linear expression. As a result, D≤2.5 is obtained, and the number of simultaneous design demands for solving the present problem is two.

Since four demands are set in the demand list, the demand is divided into two portions, that is two demands each.

The definition of the design variable in this case is illustrated in FIG. 16.

The path variable $X \in \{0, 1\}$ indicating the presence/absence of the use of a link passed through by each demand is defined as a use for the first designing operation and a use for the second designing operation. Simultaneously, the following values are defined.

design variable arranged for each site $Z \in \{0, 1\}$
$W \in \{0, 1\}$ indicating the circuit type for connection between the sites
number of ports for each circuit type used between the sites
$Y \in$ integer FIGS. 17 through 28 are views of concrete data examples of accommodation design of a path demand.

FIGS. 17 through 22 illustrate the data of the first design arithmetic operation, and FIGS. 23 through 28 illustrate the data of the second design arithmetic operation.

In the first design arithmetic operation, the problem matrix for accommodation design of the demands (1) and (2) is generated. FIG. 17 illustrates a matrix indicating an objective function. As illustrated in FIG. 17, the value corresponding to the column of the variable used as an objective function is input in the data array associated with each variable as a concrete data example to be input to the solver, and 0 is input in the column of the variable not to be used. Thus, the objective function may be expressed only by inputting the numerical values. In this example, the X variable for accommodation of the demand (1) is defined separately from the X variable for accommodation of the demand (2). However, since they are not used as an objective function, 0 is set in the corresponding columns. FIGS. 18 through 21 are examples of concrete data of a constraint matrix. Listed below as a constraint expression are a flow conservation law, a port type constraint, a hop length constraint, a device selection constraint, a device port number constraint, a constraint guarantee for uniqueness of a circuit type, and a link aggregation number constraint. In any case, each column of the data array is associated with a variable, and 0 is set for the variable not in the equation to be expressed. In addition, columns are provided for input of the value of the right side of the constraint expression, and an equality/inequality.

Figure 22:
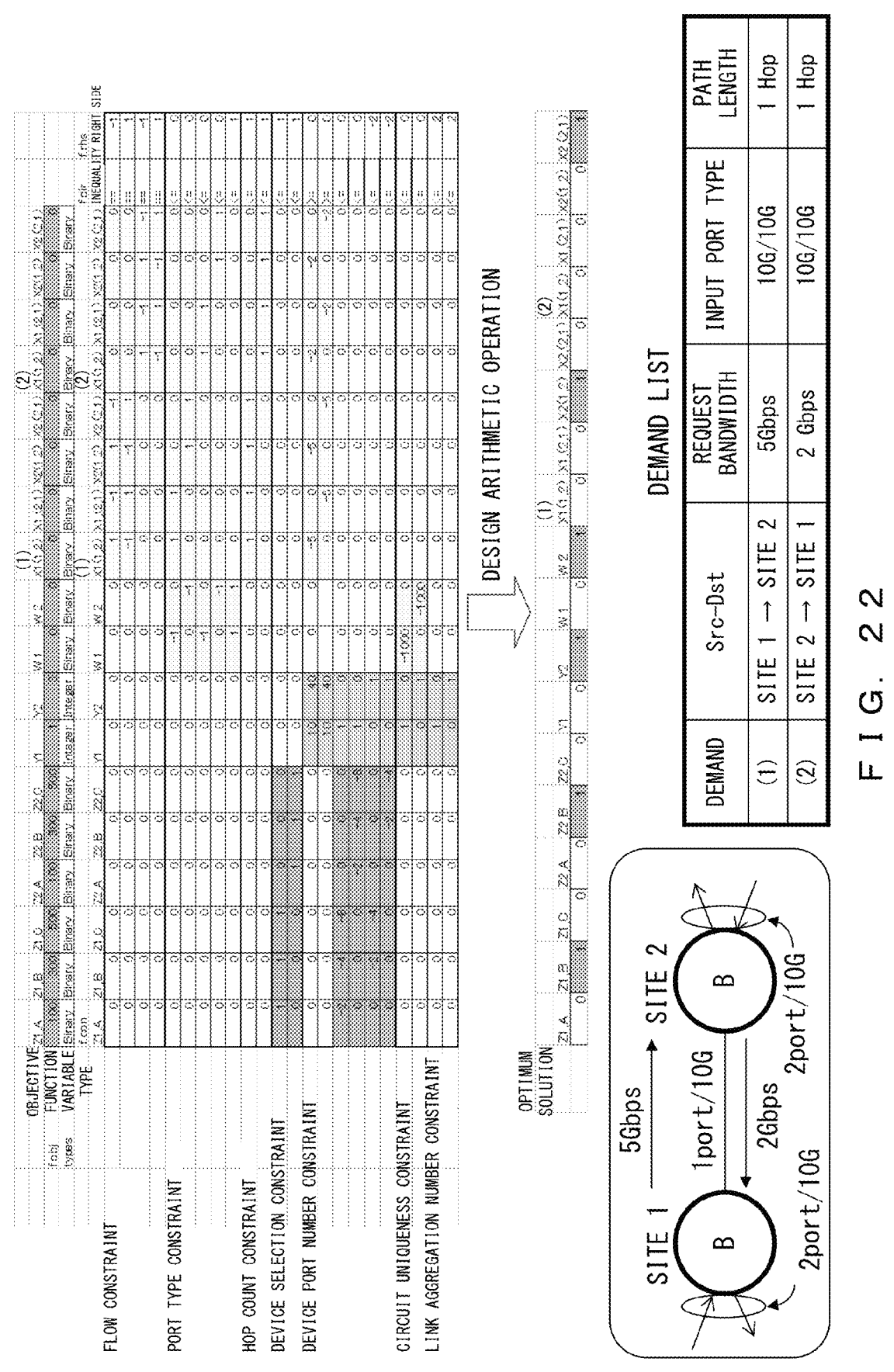

FIG. 22 is a view illustrating a problem matrix and an arithmetic result of the first arithmetic operation by a solver.

As a result of calculating by a solver a design problem matrix obtained by a combination of each constraint matrix and the vector of an objective function, the paths of the demands (1) and (2) are accommodation-designed in each direction, and the circuit for connection of the site 1 and 2 includes one designed 10 G. Furthermore, the device B is provided because the site 1 requires three 10G ports, that is, two 10G ports for external input/output, and one 10G port for connection to the site 2. Similarly, the device B is provided for the site 2. Providing the device B is indicated by setting "1" in the columns of Z1, B, Z2, and B. Using a 10G circuit is indicated by setting "1" in the columns of X2 (1, 2), X2 (2, 1) or W2.

FIGS. 23 through 28 are concrete data examples of the second arithmetic operation by the solver. In the second designing process, the demands (3) and (4) are added based on the first traffic path state. FIG. 23 illustrates the objective function of the second arithmetic operation. However, since the objective function is the same in the first and second processes, refer to FIG. 17.

FIGS. 24 through 27 illustrate the matrix indicating each constraint condition in the second designing process.

Each constraint expression expresses the demands (3) and (4). The flow conservation law, the port type constraint, the hop-length constraint, the device selection constraint, the device port number constraint, the constraint guarantee for uniqueness of a circuit type, and the link aggregation number constraint are similar to those in the first process. That is, these constraints are the same except that the first arithmetic operation describes the demands (1) and (2) while the second arithmetic operation describes the demands (3) and (4). In the device port number constraint, as indicated by the round dot line, the value reflecting the first design result is set in the right side of the device port number constraint. For example, in the device port number constraint in FIG. 26, the right side of the first expression is "5". Similarly, the right side of the second expression is "2", and indicates the amount of the first design demand (5 Gbps and 2 Gbps). On the other hand, the right side of the third expression is "−4" when the circuit type is 2. It is the sum of the values of two input/output 10G ports used when the first design demand is accommodated, and two input/output 10G ports used when the second demand is accommodated which is designed from the current point.

Figure 28:
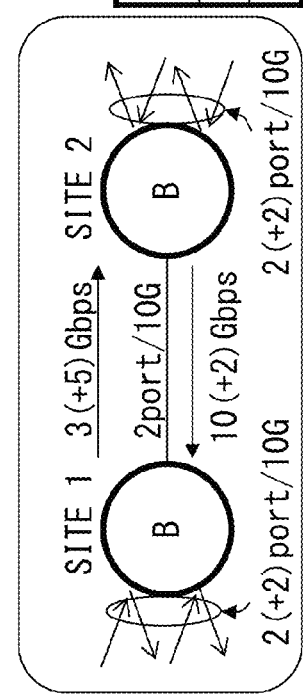
FIG. 28 is a view (part 12) of an example of concrete data of accommodation design of a path demand.

FIG. 28 illustrates the problem matrix and the result of the second arithmetic operation by the solver.

In addition to the paths of the demands (1) and (2), the demands (3) and (4) are accommodation-designed in each direction. The circuit for connection of the sites 1 and 2 is aggregation designed by two 10G circuits. It is indicated by the setting of 2 in the column of Y2. Furthermore, in each site, in addition to two 10G ports used in the input/output port by the demands (1) and (2), the demands (3) and (4) are additionally accommodated. Thus, at each site, four 10G external input/output ports and two 10G ports for connection of the sites 1 and 2, that is, a total of six 10G ports are required. Therefore, the device C is to be provided at each site. Providing the device C is indicated by setting "1" in the columns of Z1, C, Z3, C.

Figure 29:
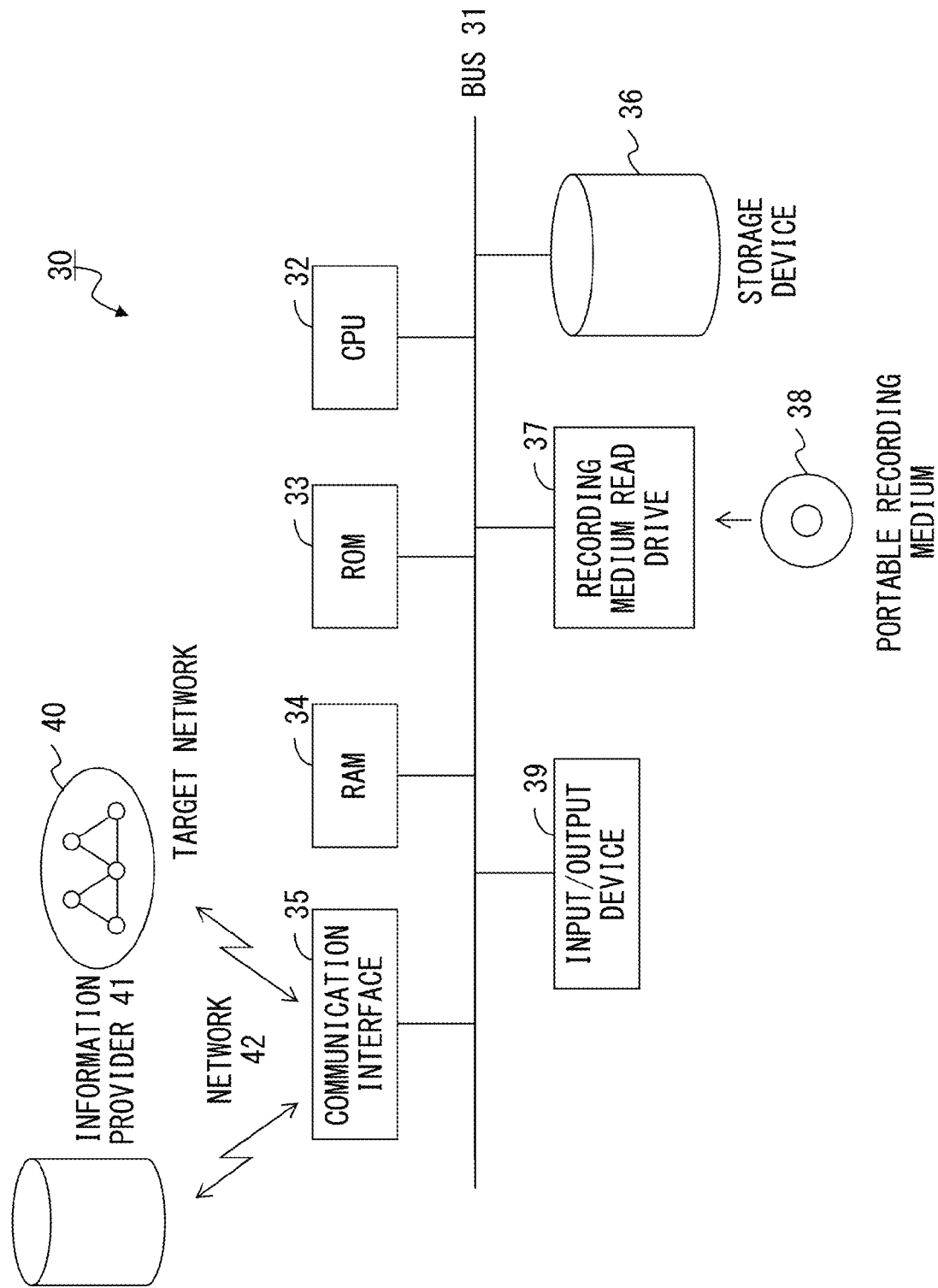
FIG. 29 is an example of a configuration of the hardware of a computer required when the designing method according to an embodiment of the present invention is executed by a program.

FIG. 29 is an example of a configuration of the hardware of a computer required when the designing method according to an embodiment of the present invention is executed by a program.

The designing method according to the present embodiment is executed by a program. A computer 30 for executing a program may be a stand-alone machine or may be a network device connected to a target network 40 through a communication interface 35 for automatically setting the network device of the target network 40.

The computer 30 is provided with a CPU 32 for executing a program. It also includes a storage device 36 such as a hard disk for storing a program, RAM 34 as a work area in which a program is deployed and executed, ROM 33 for storing a program for control of the site function of the computer 30, an input/output device 39 such as a keyboard, a display, a mouse, etc., and a communication interface 35 for communicating with an external unit. A recording medium read drive 37 reads a program from a portable recording medium 38 such as a DVD, a CD, a flexible disk, IC memory, etc. These components are connected through a bus 31.

The program for executing the method according to the present embodiment is stored in the storage device 36 or the portable recording medium 38. When a program is executed, the program is read from the storage device 36 or the portable recording medium 38, and deployed in the RAM 34 for execution.

A user (operator) generates a design model in executing the designing method according to the present embodiment, and configures it as an input data to the solver which provides the model as a program. The input data is input from the input/output device 39, the CPU 32 executes the program, and the display etc. displays the design result. Thus, the user is informed how the network is to be configured from the display on the display unit.

The program is also executed by download from a database held by an information provider 41 in a remote location through a network 42 connected to the communication interface 35, or in a network environment.

When the computer 30 may be a network management device connected to the target network 40 through the communication interface 35, necessary data for the configuration of a design model for the execution of the program is collected from the target network 40. Furthermore, the design information obtained after execution of the program may be transmitted from the communication interface 35 to the target network 40 as a command to automatically reflect the design contents on the target network 40.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A network setting device, comprising:
a memory; and
a processor which is connected to the memory and executes a process including:
obtaining performance information indicating performance of a solver which solves a network design problem, the network design problem being designed as a mathematical programming problem in which a plurality of traffic demands which are to be simultaneously solved by the solver among a plurality of traffic demands for each section between given starting and ending sites are accommodated in a target network;
determining an upper limit of a total number of design variables and an upper limit of a total number of constraints which indicate a problem scale in the network design problem based on the performance information;
deriving a number of simultaneous demands which represents a number of the traffic demands so as to satisfy a condition that a number of design variables and a number of constraints which are to be provided to the solver are respectively equal to or less than the upper limit of the total number of design variables and the upper limit of the total number of constraints;
executing the solver to perform a network design arithmetic operation for each of the derived numbers of simultaneous design demands; and
setting accommodation of the traffic demands to the devices on the target network based on a result of the network design arithmetic operation.

2. The device according to claim 1, wherein the network design problem is defined by parameters of a number of physical links, a number of sites, a number of device candidates, and a number of circuit candidates, which are provided as a network design condition.

3. The device according to claim 2, wherein a given problem scale is described by linear inequalities using the parameters.

4. The device according to claim 3, wherein a number of simultaneous design demands is derived by an arithmetic operation of linear inequalities using the parameters.

5. The device according to claim 1, wherein an accommodation design result of a traffic demand obtained as a result of the network design arithmetic operation is presented to an operator.

6. The device according to claim 5, wherein based on the accommodation design result, the operator manually sets accommodation of the traffic demand to the target network.

7. The device according to claim 5, wherein based on the accommodation design result, the operator automatically sets accommodation of the traffic demand to the target network.

8. A network setting method for execution by a network design device, the network design method comprising:
  obtaining performance information indicating performance of a solver which solves a network design problem, the network design problem being designed as a mathematical programming problem in which a plurality of traffic demands which are to be simultaneously solved by the solver among a plurality of traffic demands for each section between given starting and ending sites are accommodated in a target network;
  determining an upper limit of a total number of design variables and an upper limit of a total number of constraints which indicate a problem scale in the network design problem based on the performance information;
  deriving, by the network design device, a number of simultaneous design demands which represents a number of the traffic demands so as to satisfy a condition that a number of design variables and a number of constraints which are to be provided to the solver are respectively equal to or less than the upper limit of the total number of design variables and the upper limit of the total number of constraints;
  executing, by the network design device, the solver to perform a network design arithmetic operation for each of the derived numbers of simultaneous design demands; and
  setting accommodation of the traffic demands to the devices on the target network based on a result of the network design arithmetic operation.

9. A computer readable, non-transitory storage medium having stored therein a program for causing a network setting device to perform a network design process, the network design process comprising: obtaining performance information indicating performance of a solver which solves a network design problem, the network design problem being designed as a mathematical programming problem in which a plurality of traffic demands which are to be simultaneously solved by the solver among a plurality of traffic demands for each section between given starting and ending sites are accommodated in a target network; determining an upper limit of a total number of design variables and an upper limit of a total number of constraints which indicate a problem scale in the network design problem based on the performance information; deriving a number of simultaneous design demands which represents a number of the traffic demands so as to satisfy a condition that a number of design variables and a number of constraints which are to be provided to the solver are respectively equal to or less than the upper limit of the total number of design variables and the upper limit of the total number of constraints; executing the solver to perform a network design arithmetic operation for each of the derived numbers of simultaneous design demands; and setting accommodation of the traffic demands to the devices on the target network based on a result of the network design arithmetic operation.

10. The network setting device according to claim 1,
  wherein the network design problem is derived by using parameters of the number of simultaneous design demands, a number of physical links, a number of sites, a number of device candidates, and a number of circuit candidates, and
  wherein the deriving includes calculating a first linear expression which represents the total number of design variables and a second linear expression which represents the total number of constraints, and deriving the number of simultaneous design demands so as to satisfy a condition that the first linear expression and the second linear expression are respectively equal to or less than the upper limit of the total number of design variables and the upper limit of the total number of constraints.

* * * * *